United States Patent
Nakada et al.

(10) Patent No.: US 11,958,939 B2
(45) Date of Patent: Apr. 16, 2024

(54) POLYIMIDE PRECURSOR SOLUTION, METHOD FOR PRODUCING POROUS POLYIMIDE FILM, AND POROUS POLYIMIDE FILM

(71) Applicant: FUJIFILM Business Innovation Corp., Tokyo (JP)

(72) Inventors: Kosuke Nakada, Minamiashigara (JP); Shigeru Seitoku, Minamiashigara (JP); Takeshi Iwanaga, Minamiashigara (JP); Tomoyo Okubo, Minamiashigara (JP); Hajime Sugahara, Minamiashigara (JP); Hidekazu Hirose, Minamiashigara (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 449 days.

(21) Appl. No.: 17/403,011

(22) Filed: Aug. 16, 2021

(65) Prior Publication Data

US 2022/0267527 A1    Aug. 25, 2022

(30) Foreign Application Priority Data

Feb. 22, 2021  (JP) ................................. 2021-026032

(51) Int. Cl.
   *C08G 73/10*    (2006.01)
   *C08J 5/18*     (2006.01)
   *C08J 9/26*     (2006.01)

(52) U.S. Cl.
   CPC ............ *C08G 73/1007* (2013.01); *C08J 5/18* (2013.01); *C08J 9/26* (2013.01); *C08J 2379/08* (2013.01)

(58) Field of Classification Search
   CPC . C08G 73/1007; C08G 73/1032; C08L 79/08; C08J 3/07; C08J 2379/08
   See application file for complete search history.

(56) References Cited

U.S. PATENT DOCUMENTS

| 2016/0133935 | A1* | 5/2016 | Kajita ............... | H01M 10/0525 252/182.1 |
| 2018/0244023 | A1 | 8/2018 | Nukada et al. | |
| 2018/0244886 | A1* | 8/2018 | Nukada ................. | C08F 220/14 |
| 2019/0071569 | A1* | 3/2019 | Kajiwara ............... | G01N 30/88 |

FOREIGN PATENT DOCUMENTS

| EP | 3 007 256 A1 | 4/2016 |
| JP | 2019-044074 A | 3/2019 |

OTHER PUBLICATIONS

Jan. 31, 2022 extended Search Report issued in European Patent Application No. 21190965.0.

* cited by examiner

*Primary Examiner* — Gregory Listvoyb
(74) *Attorney, Agent, or Firm* — Oliff PLC

(57) ABSTRACT

A polyimide precursor solution contains: an aqueous solvent containing water; particles; and a polyimide precursor, wherein the polyimide precursor has a high molecular weight region A containing a high molecular weight side maximum value and a low molecular weight region B containing a low molecular weight side maximum value in an elution curve obtained by gel permeation chromatography, a weight average molecular weight in the high molecular weight region A is 50,000 or more, a weight average molecular weight in the low molecular weight region B is 10,000 or more and 30,000 or less, and a value of a/(a+b) is 0.60 or more and 0.98 or less in which a represents an area of the high molecular weight region A and b represents an area of the low molecular weight region B.

17 Claims, 3 Drawing Sheets

POLYIMIDE PRECURSOR SOLUTION, METHOD FOR PRODUCING POROUS POLYIMIDE FILM, AND POROUS POLYIMIDE FILM

CROSS-REFERENCE TO RELATED APPLICATIONS

This application is based on and claims priority under 35 USC 119 from Japanese Patent Application No. 2021-026032 filed on Feb. 22, 2021.

BACKGROUND

Technical Field

The present invention relates to a polyimide precursor solution, a method for producing a porous polyimide film, and a porous polyimide film.

Related Art

JP-A-2019-044074 proposes "a polyimide precursor solution, containing a polyimide precursor which has a region A containing a high molecular weight side maximum value and a region B containing a low molecular weight side maximum value in an elution curve obtained by a gel permeation chromatography method, in which in terms of polystyrene, a weight average molecular weight of the region A is 10,000 or more and a weight average molecular weight of the region B is less than 10,000, and when an area of the region A is set to a and an area of the region B is set to b, the equation (1) (equation (1): $a/(a+b)=0.70$ or more and 0.98 or less) is satisfied".

SUMMARY

Aspects of non-limiting embodiments of the present disclosure relate to a polyimide precursor solution, from which a dried film having good coatability and high strength may be obtained while ensuring the dispersibility of particles, as compared with a case where in a polyimide precursor solution containing an aqueous solvent containing water, particles and a polyimide precursor, the following $a/(a+b)$ value in the polyimide precursor is less than 0.60 or more than 0.98.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages describer above.

According to an aspect of the present disclosure, there is provided a polyimide precursor solution, containing:
an aqueous solvent containing water;
particles; and
a polyimide precursor, wherein
the polyimide precursor has a high molecular weight region A containing a high molecular weight side maximum value and a low molecular weight region B containing a low molecular weight side maximum value in an elution curve obtained by gel permeation chromatography, a weight average molecular weight in the high molecular weight region A is 50,000 or more, a weight average molecular weight in the low molecular weight region B is 10,000 or more and 30,000 or less, and a value of $a/(a+b)$ is 0.60 or more and 0.98 or less in which a represents an area of the high molecular weight region A and b represents an area of the low molecular weight region B.

BRIEF DESCRIPTION OF THE DRAWINGS

Exemplary embodiment(s) of the present invention will be described in detail based on the following figures, wherein.

DETAILED DESCRIPTION

Figure 1:
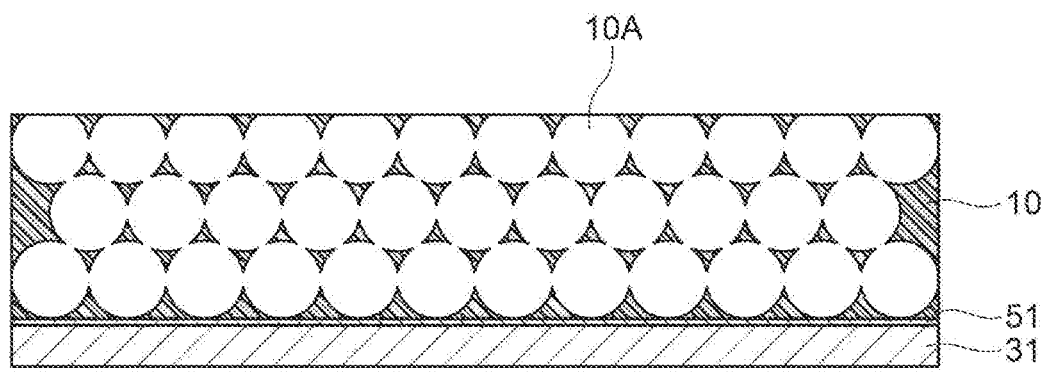
FIG. 1 is a schematic diagram showing a configuration of a porous polyimide film according to the present exemplary embodiment.

Hereinafter, an exemplary embodiment as an example of the present invention will be described. These descriptions and Examples illustrate the exemplary embodiment, and do not limit the scope of the invention.

In the numerical ranges described in stages in the present description, an upper limit or a lower limit described in one numerical range may be replaced with an upper limit or a lower limit of the numerical range described in other stages. Further, in the numerical ranges described in the present description, the upper limit or the lower limit of the numerical range may be replaced with values shown in Examples.

Each component may contain plural corresponding substances.

In a case of referring to an amount of each component in a composition, when there are plural substances corresponding to each component in the composition, unless otherwise specified, it refers to a total amount of the plural substances present in the composition.

The term "film" is a concept that includes not only what is generally called "film" but also what is generally called "sheet".

<Polyimide Precursor Solution>

The polyimide precursor solution according to the present exemplary embodiment contains an aqueous solvent containing water, particles, and a polyimide precursor.

The polyimide precursor has a high molecular weight region A containing a high molecular weight side maximum value and a low molecular weight region B containing a low molecular weight side maximum value in an elution curve obtained by gel permeation chromatography, a weight average molecular weight in the high molecular weight region A is 50,000 or more, a weight average molecular weight in the low molecular weight region B is 10,000 or more and 30,000 or less, and a value of $a/(a+b)$ is 0.60 or more and 0.98 or less in which a represents an area of the high molecular weight region A and b represents an area of the low molecular weight region B.

From the polyimide precursor solution according to the present exemplary embodiment, a dried film having good coatability and high strength may be obtained while ensuring the dispersibility of particles. The reasons are presumed as follows.

The polyimide precursor solution in which particles are dispersed has a high viscosity when the weight average molecular weight of the polyimide precursor (that is, polyamic acid) is high. Accordingly, when coating the polyimide precursor solution, the coating film is likely to be uneven.

On the other hand, when the weight average molecular weight of the polyimide precursor (that is, polyamic acid) is lowered in order to reduce the viscosity of the solution, the strength of the dried film obtained by drying the coating film of the polyamide precursor solution is reduced. When the strength of the dried film is reduced, breakage occurs when the dried film is peeled off from the coated substrate and when the dried film is wound into a roll before imidization.

However, as shown in JP-A-2019-044074, even when the "molecular weight properties obtained by gel permeation chromatography" of the polyimide precursor are adjusted simply for the purpose of improving the coatability and the strength of the dried film, the dispersibility of the particles is decreased.

In contrast, when the polyimide precursor having the molecular weight properties obtained by the gel permeation chromatography is applied, a dried film having good coatability and high strength may be obtained. In addition, a decrease in the dispersibility of the particles may be prevented, and the dispersibility of the particles may be also ensured. When the weight average molecular weight of the polyimide precursor is too low, the viscosity of the polyimide precursor solution in which the particles are dispersed becomes too low, and the particles may settle and the dispersibility of the particles may decrease. In contrast, the polyimide precursor solution according to the present exemplary embodiment contains a polyimide precursor having a high weight average molecular weight (a polyimide precursor having a weight average molecular weight of 50,000 or more) and a polyimide precursor having a low weight average molecular weight (a polyimide precursor having a weight average molecular weight of 10,000 or more and 30,000 or less). Therefore, it is considered that the viscosity of the polyimide precursor solution may not become too low, the particles may not settle, and the dispersibility of the particles may be ensured.

It is presumed that from the polyimide precursor solution according to the present exemplary embodiment, a dried film having good coatability and high strength may be obtained while ensuring the dispersibility of particles.

Then, when the polyimide precursor solution according to the present exemplary embodiment is applied, in the process of producing the porous polyimide film, uneven coating may be prevented and breakage of the dried film may be prevented. Moreover, since the dispersibility of the particles is ensured, the particles are dispersed in the dried film in a nearly uniform state. Therefore, a porous polyimide film having nearly uniform pores, less surface unevenness, and prevented breakage may be obtained.

Hereinafter, the details of the polyimide precursor solution according to the present exemplary embodiment will be described.

(Polyimide Precursor)

The polyimide precursor has a high molecular weight region A containing a high molecular weight side maximum value and a low molecular weight region B containing a low molecular weight side maximum value in an elution curve obtained by gel permeation chromatography. That is, the polyimide precursor has two maximum values, i.e., a high molecular weight side maximum value and a low molecular weight side maximum value, in the elution curve obtained by gel permeation chromatography (GPC).

A weight average molecular weight in the high molecular weight region A is 50,000 or more.

When the weight average molecular weight in the high molecular weight region A is less than 50,000, the strength of the dried film is lowered. The upper limit of the weight average molecular weight in the high molecular weight region A is, for example, 100,000 or less.

A weight average molecular weight in the low molecular weight region B is 10,000 or more and 30,000 or less.

When the weight average molecular weight in the low molecular weight region B is less than 10,000, the strength of the dried film is lowered.

When the weight average molecular weight in the low molecular weight region B is more than 30,000, the coatability is lowered and uneven coating occurs.

The difference between the weight average molecular weight in the high molecular weight region A and the weight average molecular weight in the low molecular weight region B is preferably 20,000 or more and 90,000 or less, and more preferably 20,000 or more and 70,000 or less, from the viewpoints of ensuring the dispersibility of the particles, improving the coatability, and improving the strength of the dried film.

Here, the weight average molecular weights in the high molecular weight region A and the low molecular weight recon B are in the range in terms of polystyrene.

When the area of the high molecular weight region A is set to a and the area of the low molecular weight region B is set to b, the a/(a+b) value (hereinafter, also referred to as "GPC peak area ratio") is 0.60 or more and 0.98 or less.

When the GPC peak area ratio is within the above range, a dried film having good coatability and high strength may be obtained while ensuring the dispersibility of particles.

When the GPC peak area ratio is less than 0.60, the strength of the dried film is lowered.

When the GPC peak area ratio is more than 0.98, the coatability is lowered and uneven coating occurs.

From the viewpoints of ensuring the dispersibility of the particles, improving the coatability, and improving the strength of the dried film, the GPC peak area ratio is preferably 0.70 or more and 0.95 or less, and more preferably 0.75 or more and 0.93 or less.

From the viewpoints of ensuring the dispersibility of the particles, improving the coatability, and improving the strength of the dried film, the weight average molecular weight of the whole polyimide precursor is preferably 20,000 or more and 200,000 or less, more preferably 30,000 or more and 150,000 or less, and still more preferably 50,000 or more and 130,000 or less.

Here, the weight average molecular weight of the whole polyimide precursor represents the weight average molecular weight in the whole region including the high molecular weight region A containing a high molecular weight side maximum value and the low molecular weight region B containing a low molecular weight side maximum value.

The weight average molecular weight of the polyimide precursor is measured by a gel permeation chromatography (GPC) method under the following measurement conditions.

Column: Tosoh TSKgelα-M (7.8 mm I.D×30 cm)
Fluent: DMP (dimethylformamide)/30 mM LiBr/60 mM phosphoric acid
Flow rate: 0.6 mL/min
Injection amount: 60 μL
Detector: RI (Differential refractometer)

On the other hand, the method for measuring the area a of the high molecular weight region A and the area b of the low molecular weight region B is as follows.

First, a polyimide precursor solution as a measurement target is prepared. Next, the polyimide precursor in the polyimide precursor solution is measured under the same conditions as the above GPC method. When measurement by the GPC method is made, an elution curve is obtained. From the elution curve, the high molecular weight region A and the low molecular weight region B are specified. Then, the weight average molecular weights in the high molecular weight region A and the low molecular weight region B are obtained in terms of polystyrene. The area a of the high molecular weight region A and the area b of the low molecular weight region B are obtained, and the GPC peak area ratio (a/(a+b)) is calculated.

The polyimide precursor solution containing the polyimide precursor having the above molecular weight properties may be obtained, for example, by mixing two polyimide precursor solutions having different molecular weights obtained by the method for producing a polyimide precursor solution. Specifically, by adjusting the polymerization conditions of the polyimide precursor such as the polymerization temperature and reaction time, a first polyimide precursor solution having a weight average molecular weight of 50,000 or more and a second polyimide precursor solution having a weight average molecular weight of 10,000 or more and 30,000 or less are prepared. Then, the first polyimide precursor solution and the second polyimide precursor solution are mixed such that the GPC peak area ratio satisfies the above range.

The polyimide precursor is a resin (that is, polyimide precursor) having a repeating unit represented by the general formula (I).

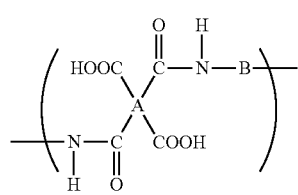

In the general formula (I), A represents a tetravalent organic group and B represents a divalent organic group.

Here, in the general formula (I), the tetravalent organic group represented by A is a residue obtained by removing four carboxyl groups from a tetracarboxylic dianhydride as a raw material.

On the other hand, the divalent organic group represented by B is a residue obtained by removing two amino groups from a diamine compound as a raw material.

That is, the polyimide precursor having a repeating unit represented by the general formula (I) is a polymer of a tetracarboxylic dianhydride and a diamine compound.

Examples of the tetracarboxylic dianhydride include both aromatic and aliphatic ones, and aromatic ones are preferred. That is, in the general formula (I), the tetravalent organic group represented by A is preferably an aromatic organic group.

Examples of the aromatic tetracarboxylic dianhydride include pyromellitic dianhydride, 3,3',4,4'-benzophenone tetracarboxylic dianhydride, 3,3,4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenyl ether tetracarboxylic dianhydride, 3,3',4,4'-dimethyldiphenylsilanetetracarboxylic dianhydride, 3,3'4,4'-tetraphenylsilanetetracarboxylic dianhydride, 1,2,3,4-frantetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropyridene diphthalic dianhydride, 3,3',4,4'-biphenyltetracarboxylic dianhydride, 2,3,3',4'-biphenyltetracarboxylic dianhydride, bis(phthalic acid)phenylphosphine oxide dianhydride, p-phenylene-bis(triphenylphthatic acid)dianhydride, m-phenylene-bis(triphenylphthalic acid)dianhydride, bis(triphenylphthalic acid)-4,4'-diphenyl ether dianhydride, and bis(triphenylphthalic acid)-4,4'-diphenylmethane dianhydride.

Examples of the aliphatic tetracarboxylic dianhydride include: aliphatic or alicyclic tetracarboxylic dianhydrides such as butanetetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 2,3-5-tricarboxycyclopentyl acetate dianhydride, 3,5,6-tricarboxynorbonan-2-acetate dianhydride, 2,3,4,5-tetrahydrofuran tetracarboxylic dianhydride, 5-(2,5-dioxotetrahydrofuryl)-3-methyl-3-cyclohexene-1,2-dicarboxylic dianhydride, and bicyclo[2,2,2]-octo-7-ene-2,3,5,6-tetracarboxylic dianhydride; and aliphatic tetracarboxylic dianhydrides having an aromatic ring such as 1,3,3a,4,5,9b-hexahydro-5-(tetrahydro-2,5-dioxo-3-franyl)-naphtho[1,2-c]furan-1,3-dione, 1,3,3a,4,5,9b-hexahydro-5-methyl-5-(tetrahydro-2,5-dioxo-3-franyl)-naphthol[1,2-c]furan-1,3-dione, and 1,3,3a,4,5,9b-hexahydro-8-methyl-5-(tetrahydro-2,5-dioxo-3-franyl)-naphtho[1,2-c]furan-1,3-dione.

Among these, the tetracarboxylic dianhydride is preferably an aromatic tetracarboxylic dianhydride. Specifically, preferred are pyromellitic dianhydride, 3,3',4,4'-biphenyltetracarboxylic dianhydride, 2-3,3',4'-biphenyltetracarboxylic dianhydride, 3,3',4,4'-biphenyl ether tetracarboxylic dianhydride, and 3,3',4,4'-benzophenone tetracarboxylic dianhydride, more preferred are pyromellitic dianhydride, 3,3',4,4'-biphenyltetracarboxylic dianhydride, and 3,3',4,4'-benzophenone tetracarboxylic dianhydride, and particularly preferred is 3,3',4,4'-biphenyltetracarboxylic dianhydride.

The tetracarboxylic dianhydride may be used alone or in combination of two or more thereof.

When two or more tetracarboxylic dianhydrides are used in combination, aromatic tetracarboxylic dianhydrides or aliphatic tetracarboxylic dianhydrides may be used in combination, or an aromatic tetracarboxylic dianhydride and an aliphatic tetracarboxylic dianhydride may be used in combination.

On the other hand, the diamine compound is a diamine compound having two amino groups in the molecular structure thereof. Examples of the diamine compound include both aromatic and aliphatic diamine compounds, and the aromatic diamine compound is preferred. That is, in the general formula (I), the divalent organic group represented by B is preferably an aromatic organic group.

Examples of the diamine compound include: aromatic diamines such as p-phenylenediamine, m-phenylenediamine, 4,4'-diaminodiphenylmethane, 4,4'-diaminodiphenylethane, 4,4'-diaminodiphenyl ether, 4,4'-diaminodiphenyl sulfide, 4,4'-diaminodiphenylphenyl sulfone, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 4,4'-aminobenzanilide, 3,5-diamino-3'- trifluoromethylbenzanilide, 3,5-diamino-4'-trifluoromethylbenzanilide, 3,4'-diaminodiphenyl ether, 2,7-diaminofluorene, 2,2-bis(4-aminophenyl)hexafluoropropane, 4,4'-methylene-bis (2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4-4'-diaminobiphenyl, 4,4'-diamino-2,2'-bis(trifluoromethyl)biphenyl-2,2-bis[4-(4-aminophenoxy) phenyl] propane, 2,2-bis[4-(4-aminophenoxy) phenyl]hexafluoropropane, 1,4-bis (4-aminophenoxy)benzene, 4,4'-bis(4-aminophenoxy)-biphenyl, 1,3'-bis (4-aminophenoxy) benzene, 9,9-bis(4-aminophenyl)fluorene, 4,4'-(p-phenylene isopropylidene)bisaniline, 4,4'-(m-phenylene isopropylidene)bisaniline, 2,2'-bis[4-(4-amino-2-trifluoromethylphenoxy)phenyl]hexafluoropropane, and 4,4'-bis[4-(4-amino-2-trifluoromethyl)phenoxy]-octafluorobiphenyl; aromatic diamines having two amino groups bonded to an aromatic ring and a hetero atom other than the nitrogen atom of the amino groups, such as diaminotetraphenylthiophene; and aliphatic diamines and alicyclic diamines such as 1,1-methaxylylenediamine, 1,3-propane diamine, tetramethyldiamine, pentamethylenediamine, octamethylenediamine, nonamethylenediamine, 4,4-diaminoheptamethylenediamine, 1,4-diaminocyclohexane, isophorone diamine, tetrahydrodicyclopentadienylenediamine, hexahydro-4,7-methanoindanylene dimethylenediamine, tricyclo[6,2,1,0$^{2.7}$]-undecylenic dimethyldiamine, and 4,4'-methylenebis (cyclohexylamine).

Among these, the diamine compound is preferably an aromatic diamine compound. Specifically, preferred are p-phenylenediamine, m-phenylenediamine, 4,4'-diaminodiphenylmethane, 4,4'-diaminodiphenyl ether, 3,4'-diaminodiphenyl ether, 4,4'-diaminodiphenyl sulfide, and 4,4'-diaminodiphenyl sulfone, and particularly preferred are 4,4'-diaminodiphenyl ether and p-phenylenediamine.

The diamine compound may be used alone or in combination of two or more thereof. When two or more diamine compounds are used in combination, aromatic diamine compounds or aliphatic diamine compounds may be used in combination, or an aromatic diamine compound and an aliphatic diamine compound may be used in combination.

The content (that is, concentration) of the polyimide precursor is preferably 0.1 mass % or more and 40 mass % or less, more preferably 0.5 mass % or more and 25 mass % or less, and still more preferably 1 mass % or more and 20 mass % or less, with respect to the polyimide precursor solution.

(Particles)

Examples of the particles include resin particles and inorganic particles.

As the particles, particles that do not dissolve in the polyimide precursor solution are used.

In the present exemplary embodiment, the expression "insoluble" also includes the fact that the target substance dissolves in the range of 3 mass % or less with respect to the target liquid at 25° C.

The particles may be used alone or in combination of two or more thereof.

The particles are preferably resin particles.

The resin particles are not particularly limited, and are resin particles made of a resin other than polyimide. Examples thereof include resin particles obtained by polycondensing polymerizable monomers, such as a polyester resin and a urethane resin, and resin particles obtained by radical polymerization of polymerizable monomers, such as a vinyl resin, an olefin resin, and a fluororesin. Examples of the resin particles obtained by radical polymerization include resin particles of a (meth)acrylic resin, a (meth)acrylic acid ester resin, a styrene-(meth)acrylic resin, a polystyrene resin, and a polyethylene resin.

Among these, the resin particles are preferably at least one selected from the group consisting of a (meth)acrylic resin, a (meth)acrylic acid ester resin, a styrene-(meth)acrylic resin, and a polystyrene resin.

In the present exemplary embodiment, "(meth)acrylic" means to include both "acrylic" and "methacrylic".

The resin particles may or may not be cross-linked. Non-cross-linked resin particles are preferred because of effectively contributing to the relaxation of residual stress in the imidization step for the polyimide precursor. Further, the polyimide precursor solution more preferably contains vinyl resin particles obtained by emulsion polymerization as the resin particles in terms of simplifying the step of producing the polyimide precursor solution.

When the resin particles are vinyl resin particles, the vinyl resin particles are obtained by polymerizing a monomer. Examples of the vinyl resin monomer include the following monomers. For example, vinyl resin units obtained by polymerizing a monomer, such as styrenes having a styrene skeleton, such as styrene, alkyl-substituted styrene (for example, α-methylstyrene, 2-methylstyrene, 3-methylstyrene, 4-methylstyrene, 2-ethylstyrene, 3-ethylstyrene, and 4-ethylstyrene), halogen-substituted styrene (for example, 2-chlorostyrene, 3-chlorostyrene, and 4-chlorostyrene), and vinyl naphthalene; esters having a vinyl group, such as methyl (meth)acrylate, ethyl (meth)acrylate, n-propyl (meth)acrylate, n-butyl (meth)acrylate, lauryl (meth)acrylate, 2-ethylhexyl (meth)acrylate, trimethylolpropane trimethacrylate (TMPTMA); vinyl nitrites such as acrylonitrile and methacrylonitrile, vinyl ethers such as vinyl methyl ether and vinyl isobutyl ether; vinyl ketones such as vinyl methyl ketone, vinyl ethyl ketone, and vinyl isopropenyl ketone; acids such as (meth)acrylic acid, maleic acid, cinnamic acid, fumaric acid, and vinyl sulfonic acid; and bases such as ethyleneimine, vinylpyridine, and vinylamine.

As other monomers, a monofunctional monomer such as vinyl acetate, a bifunctional monomer such as ethylene glycol dimethacrylate, nonane diacrylate, and decanediol diacrylate, and a polyfunctional monomer such as trimethylolpropane triacrylate and trimethylolpropane trimethacrylate may be used in combination.

The vinyl resin may be a resin obtained by using these monomers alone, or a resin which is a copolymer obtained by using two or more of these monomers.

The resin particles preferably have an acidic group on the surface from the viewpoints of improving dispersibility and preventing occurrence of pinholes. It is considered that the acidic group present on the surface of the resin particles functions as a dispersant for the resin particles by forming a salt with a base such as an organic amine compound for dissolving the polyimide precursor in an aqueous solvent. Therefore, it is considered that the dispersibility of the resin particles in the polyimide precursor solution may be improved.

The acidic group contained on the surface of the resin particles is not particularly limited, and may be at least one selected from the group consisting of a carboxy group, a sulfonic acid group, and a phenolic hydroxy group. Among these, a carboxy group is preferred.

The monomer for having an acidic group on the surface of the resin particles is not particularly limited as long as it is a monomer having an acidic group. Examples thereof include a monomer having a carboxy group, a monomer having a sulfonic acid group, a monomer having a phenolic hydroxy group, and a salt thereof.

Specific examples include: a monomer having a sulfonic acid group, such as p-styrene sulfonic acid and 4-vinylbenzene sulfonic acid; a monomer having a phenolic hydroxy group, such as 4-vinyldihydrocinnamonic acid, 4-vinylphenol, and 4-hydroxy-3-methoxyl-1-propenylbenzene; a monomer having a carboxy group, such as acrylic acid, crotonic acid, methacrylic acid, 3-methyl crotonic acid, fumaric acid, maleic acid, 2-methylisocrotonic acid, 2,4-hexadienedioic acid, 2-pentenoic acid, sorbic acid, citraconic acid, 2-hexenoic acid, and monoethyl fumarate; and a salt thereof. These monomers having an acidic group may be mixed and polymerized with a monomer having no acidic group, or a monomer having no acidic group may be polymerizing and granulated, and then a monomer having an acidic group on the surface may be polymerized. These monomers may be used alone or in combination of two or more.

Among these, preferred is a monomer having a carboxy group, such as acrylic acid, crotonic acid, methacrylic acid, 3-methyl crotonic acid, fumaric acid, maleic acid, 2-methylisocrotonic acid, 2,4-hexadienedioic acid, 2-pentenoic acid, sorbic acid, citraconic acid, 2-hexenoic acid, monoethyl fumarate, and a salt thereof. The monomer having a carboxy group may be used alone or in combination of two or more thereof.

That is, the resin particles having an acidic group on the surface preferably have a skeleton derived from a monomer having a carboxy group at least selected from the group consisting of acrylic acid, crotonic acid, methacrylic acid, 3-methyl crotonic acid, fumaric acid, maleic acid, 2-methylisocrotonic acid, 2,4-hexadienedioic acid, 2-pentenoic acid, sorbic acid, citraconic acid, 2-hexenoic acid monoethyl fumarate, and a salt thereof.

When a monomer having an acidic group and a monomer having no acidic group are mixed and polymerized, the amount of the monomer having an acidic group is not particularly limited. However, when the amount of the monomer having an acidic group is too small, the dispersibility of the resin particles in the polyimide precursor solution may decrease, and when the amount of the monomer having an acidic group is too large, agglomerates of the polymer may be generated during emulsion polymerization. Therefore, the monomer having an acidic group is preferably 0.3 mass % or more and 20 mass % or less, more preferably 0.5 mass % or more and 15 mass % or less, and particularly preferably 0.7 mass % or more and 10 mass % or less based on all monomers.

On the other hand, when a monomer having no acidic group is emulsion-polymerized and then a monomer having an acidic group is further added for polymerization, from the viewpoint as described above, the amount of the monomer having an acidic group is preferably 0.01 mass % or more and 10 mass % or less, more preferably 0.05 mass % or more and 7 mass % or less, and particularly preferable 0.07 mass % or more and 5 mass % or less based on all monomers.

As described above, it is preferable that the resin particles are not cross-linked. When cross-linking resin particles, if a cross-linking agent is used as at least a part of the monomer component, the ratio of the cross-linking agent to all the monomer components is preferably 0 mass % or more and 20 mass % or less, more preferably 0 mass % or more and 5 mass % or less, and particularly preferably 0 mass %.

When the monomer used in the resin constituting the vinyl resin particles contains styrene, the ratio of styrene to all the monomer components is preferably 20 mass % or more and 100 mass % or less, and more preferably 40 mass % or more and 100 mass % or less.

The resin particles may be obtained by further polymerizing a monomer having an acidic group on the surface of a commercially available product. Specific examples of the cross-linked resin particles include cross-linked polymethyl methacrylate (MBX-series, manufactured by Sekisui Kasei Co., Ltd.), cross-linked polystyrene (SBX-series, manufactured by Sekisui Kasei Co., Ltd.), and copolymerized cross-linked resin particles of methyl methacrylate and styrene (MSX-series, manufactured by Sekisui Kasei Co., Ltd.).

Examples of the non-cross-linked resin particles include polymethyl methacrylate (MB-series, manufactured by Sekisui Kasei Co., Ltd.), and (meth)acrylic acid ester-styrene copolymers (FS-series, manufactured by Nippon Paint).

Specific examples of the inorganic particles include silica particles, titanium oxide particles, and aluminum oxide particles.

The silica particles may be sol-gel silica obtained by a sol-gel method or fumed obtained by a vapor phase method. As the silica particles, synthetic particles may be used, or commercially available products may be used. Further, the silica particles may be an aqueous solvent dispersion (for example, SNOWTEX (registered trademark) series, manufactured by Nissan Chemical Corporation) or a dry powder (for example, manufactured by AEROSIL series Evonik, Inc.). From the viewpoint of dispersibility, it is preferable to use an aqueous dispersion liquid as the silica particles.

The inorganic particles may also contain particulate materials such as a silica powder, an alumina powder, a barium sulfate powder, a titanium oxide powder, mica, and talc, which are added to improve mechanical strength.

The volume average particle diameter of the particles is preferably 0.1 μm or more and 1 μm or less.

The volume average particle diameter of the particles is more preferably 0.25 μm or more an 0.98 μm or less, and still more preferably 0.25 μm or more and 0.95 μm or less.

The volume particle size distribution index (GSDv) of the particles is preferably 1.30 or less, more preferably 1.25 or less, and most preferably 1.20 or less.

The volume average particle diameter of the particles is measured by using a volume-based particle diameter distribution obtained by measurement by a laser diffraction type particle diameter distribution analyzer (for example, Coulter Counter LS13, manufactured by Beckman Coulter), drawing the cumulative distribution from the small particle diameter side with respect to the divided particle size range (so-called channel), and using the particle diameter corresponding to the cumulative percentage of 50% with respect to all the particles as the volume average particle diameter D50v.

Then, the volume particle size distribution index of the particles is calculated as $(D84v/D16v)^{1/2}$ from the particle diameter distribution in the polyimide precursor solution. In the volume cumulative distribution drawn from the small particle diameter side, the particle diameter corresponding to the cumulative percentage of is the volume particle diameter D16v, and the particle diameter corresponding to the cumulative percentage of 50% is the volume average particle diameter D50 v.

The volume content ratio (particles/polyimide precursor) of the particles to the polyimide precursor is preferably 40/60 or more and 80/20 or less, more preferably 45/55 or more and 78/22 or less, and still more preferably 50/50 or more and 74/26 or less.

The content of the particles is preferably 30 mass % or more and 85 mass % or less, more preferably 35 mass % or more and 80 mass % or less, and still more preferably 40 mass % or more and 80 mass % or less with respect to the total amount of the polyimide precursor and the particles.

When the polyimide precursor solution contains the particles within the above range, in producing the porous polyimide film, in a case where the polyimide precursor solution is coated to form a coating film, resin particles may be likely to be present in the entire coating film. Therefore, the pores obtained by removing the resin particles may be likely to present in the entire film, and it may be easier to form a structure in which the pores communicate with each other.

Then, even when the polyimide precursor solution contains the particles within the above range, a dried film having good coatability and high strength may be obtained while ensuring the dispersibility of particles.

(Aqueous Solvent)

As the aqueous solvent, when polymerizing a tetracarboxylic dianhydride and a diamine compound in a resin particle or inorganic particle dispersion liquid, the aqueous solvent in the resin particle or inorganic particle dispersion liquid for the preparation of the resin particle or inorganic particle dispersion liquid may be used as it is. When polymerizing a tetracarboxylic dianhydride and a diamine compound, an aqueous solvent may be prepared so as to be suitable for the polymerization.

The aqueous solvent is an aqueous solvent containing water.

Examples of water include distilled water, ion-exchanged water, ultrafiltered water, and pure water.

The content of water is preferably 50 mass % or more with respect to the total amount of the aqueous solvent.

When the content of water is within the above numerical range, the boiling point of the aqueous solvent may be further lowered. Therefore, the aqueous solvent may be more likely to boil in the gaps between the polyimide precursors. Accordingly, a larger number of pores are formed by volatilizing the aqueous solvent, and it may be easier to form a structure in which the pores communicate with each other.

The content of water is more preferably 70 mass % or more and 100 mass % or less, and still more preferably 80 mass % or more and 100 mass % or less, with respect to the total amount of the aqueous solvent.

The aqueous solvent may contain a solvent other than water.

The solvent other than water is preferably water soluble. Here, the "water-soluble" means that the target substance dissolves in water in an amount of mass % or more at 25° C.

Examples of the solvent other than water include a water-soluble organic solvent and an aprotic polar solvent. The solvent other than water is preferably an aprotic polar solvent.

Examples of the water-soluble organic solvent include a water-soluble ether-based solvent, a water-soluble ketone-based solvent, and a water-soluble alcohol-based solvent.

The water-soluble ether-based solvent is a water-soluble solvent having an ether bond in one molecule.

Examples of the water-soluble ether-based solvent include tetrahydrofuran (THF), dioxane, trioxane, 1,2-dimethoxyethane, diethylene glycol dimethyl ether, and diethylene glycol diethyl ether. Among these, the water-soluble ether-based solvent is preferably tetrahydrofuran and dioxane.

The water-soluble ketone-based solvent is a water-soluble solvent having a ketone group in one molecule. Examples of the water-soluble ketone-based solvent include acetone, methyl ethyl ketone, and cyclohexanone. Among these, the water-soluble ketone-based solvent is preferably acetone.

The water-soluble alcohol-based solvent is a water-soluble solvent having an alcoholic hydroxy group in one molecule. Examples of the water-soluble alcohol solvent include methanol, ethanol, 1-propanol, 2-propanol, tert-butyl alcohol, ethylene glycol, ethylene glycol monoalkyl ether, propylene glycol, propylene glycol monoalkyl ether, diethylene glycol, diethylene glycol monoalkyl ether, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, glycerin, 2-ethyl-2-hydroxymethyl-1,3-propanediol, and 1,2,6-hexanetriol. Among these, the water-soluble alcohol solvent is preferably methanol, ethanol, 2-propanol, ethylene glycol, ethylene glycol monoalkyl ether, propylene glycol, propylene glycol monoalkyl ether, diethylene glycol, and diethylene glycol monoalkyl ether.

Examples of the aprotic polar solvent include a solvent having a boiling point of 150° C. or higher and 300° C. or lower and a dipole moment of 3.0 D or more and 5.0 D or less.

Specific examples of the aprotic polar solvent include N-methyl-2-pyrrolidone (NMP), N,N-dimethylformamide (DMF), N,N-dimethylacetamide (DMAc), dimethyl sulfoxide (DMSO), hexamethylenephosphoramide (HMPA), N-methylcaprolactam, N-acetyl-2-pyrrolidone, 1,3-dimethyl-2-imidazolidinone (DMI), N,N'-dimethylpropylene urea, tetramethylurea, trimethyl phosphate, and triethyl phosphate.

The aqueous solvent preferably contains an aprotic polar solvent as the solvent other than water. Moreover, the content of the aprotic polar solvent is preferably 1 part by mass or more and 50 parts by mass or less with respect to 100 parts by mass of the particles.

When the aqueous solvent contains aprotic polar solvent as the solvent other than water, the content of the aprotic polar solvent is more preferably 3 part by mass or more and 45 parts by mass or less, and still preferably 5 part by mass or more and 45 parts by mass or less, with respect to 100 parts by mass of the particles.

(Organic Amine Compound)

The polyimide precursor solution preferably contains an organic amine compound.

When the polyimide precursor solution contains an organic amine compound, the solubility of the polyimide precursor in a solvent may be easily increased, the film-forming property may be easily improved, and the storage stability of the polyimide precursor solution may be easily improved.

The organic amine compound is a compound that amine-chlorinates a polyimide precursor (specifically, a carboxy group of the polyimide precursor) to increase the solubility in the aqueous solvent and that also functions as an imidization accelerator. Specifically, the organic amine compound is preferably an amine compound having a molecular weight of 170 or less. The organic amine compound may be a compound excluding a diamine which is a raw material of the polyimide precursor.

The effect of the organic amine compound of amine-chlorinating the polyimide precursor (specifically, a carboxy group of the polyimide precursor) to increase the solubility in the aqueous solvent and to promote imidization may be further enhanced when the content of water contained in the aqueous solvent is 50 mass % or more with respect to the total amount of the aqueous solvent.

Therefore, it is preferable that the polyimide precursor solution contains an organic amine compound and has a content of water of 50 mass % or more with respect to the total amount of the aqueous solvent.

The organic amine compound is preferably a water-soluble compound.

Examples of the organic amine compound include a primary amine compound, a secondary amine compound, and a tertiary amine compound.

Among these, the organic amine compound is preferably at least one selected from a secondary amine compound and a tertiary amine compound and particularly preferably a tertiary amine compound. When a tertiary amine compound or a secondary amine compound (in particular, a tertiary amine compound) is applied as the organic amine compound, the solubility of the polyimide precursor in a solvent may be more easily increased, the film-forming property may be easily improved, and the storage stability of the polyimide precursor solution may be more easily improved.

Examples of the organic amine compound also include a polyvalent amine compound having a valency of 2 or more in addition to a monovalent amine compound. When a polyvalent amine compound having a valency of 2 or more is applied, a pseudo-cross-linked structure may be easily formed between molecules of the polyimide precursor, and the storage stability of the polyimide precursor solution may be easily improved.

Examples of the primary amine compound include methylamine, ethylamine, n-propylamine, isopropylamine, 2-ethanolamine, and 2-amino-2-methyl-1-propanol.

Examples of the secondary amine compound include dimethylamine, 2-(methylamino)ethanol, 2-(ethylamino) ethanol, and morpholine.

Examples of the tertiary amine compound include 2-dimethylaminoethanol, 2-diethylaminoethanol, 2-dimethylaminopropanol, pyridine, triethylamine, picoline, N-triethylmorpholine, N-ethylmorpholine, 1,2-dimethylimidazole, and 2-ethyl-4-methylimidazole.

From the viewpoints of pot life and film thickness uniformity of the polyimide precursor solution, the organic amine compound is preferably a tertiary amine compound. In this regard, the organic amine compound is more preferably at least one selected from the group consisting of 2-dimethylaminoethanol, 2-diethylaminoethanol, 2-dimethylaminopropanol, pyridine, triethylamine, picoline N-methylmorpholine, N-ethylmorpholine, 1,2-dimethylimidazole, 2-ethyl-4-methylimidazole, N-methylpiperidine, and N-ethylpiperidine.

Here, from the viewpoint of film-forming property, the organic amine compound is also preferably an amine compound (in particular, a tertiary amine compound) having a heterocyclic structure containing nitrogen. Examples of the amine compound having a heterocyclic structure containing nitrogen (hereinafter referred to as "nitrogen-containing heterocyclic amine compound") include isoquinolines (amine compounds having an isoquinoline skeleton), pyridines (amine compounds having a pyridine skeleton), pyrimidines (amine compounds having a pyrimidine skeleton), pyrazines (amine compounds having a pyrazine skeleton), piperazines (amine compounds having a piperazine skeleton), triazines (amine compounds having a triazine skeleton), imidazoles (amine compounds having an imidazole skeleton), morpholines (amine compounds having a morpholine skeleton), polyaniline, polypyridine, and polyamine.

From the viewpoint of film-forming property, the organic amine compound is preferably at least one selected from the group consisting of morpholines, pyridines, piperidines, and imidazoles, and more preferably at least one selected from the group consisting of morpholines and imidazoles.

Particularly from the viewpoints of ensuring the dispersibility of the particles, improving the coatability, and improving the strength of the dried film, the organic amine compound is preferably at least one selected from the group consisting of imidazoles represented by the following general formula (IM) and morpholines represented by the following general formula (MO).

The imidazoles represented by the general formula (IM) and the morpholines represented by the general formula (MO) amine-chlorinate the polyimide precursor (specifically, the carboxy group of the polyimide precursor) to facilitate the solubility of the polyimide precursor in a solvent and facilitate the coatability. It is considered that a part of the organic amine salt of the polyimide precursor functions as a dispersant for the particles and may improve the dispersibility of the particles. Further, the imidazoles represented by the general formula (IM) and the morpholines represented by the general formula (MO) function as an imidization accelerator, so that it may be easy to obtain a high-strength dried film. Therefore, it may be easy to ensure the dispersibility of the particles, improve the coatability, and improve the strength of the dried film.

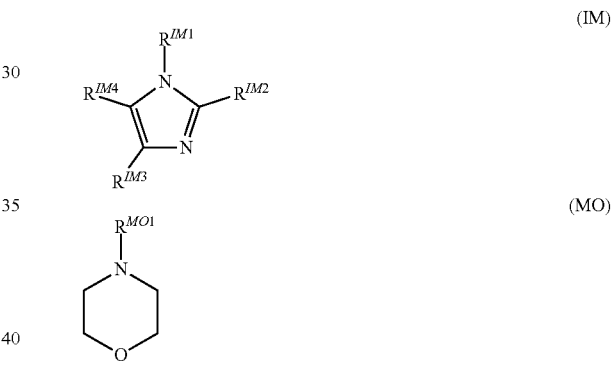

In the general formula (IM), $R^{IM1}$, $R^{IM2}$, $R^{IM3}$, and $R^{IM4}$ each independently represent a hydrogen atom or an alkyl group having 1 or more and 8 or less carbon atoms.

In the general formula (MO), $R^{MO1}$ represents a hydrogen atom or an alkyl group having 1 or more and 8 or less carbon atoms.

In the general formula (IM) and the general formula (MO), the alkyl group represented by $R^{IM1}$ to $R^{IM4}$ and $R^{MO1}$ may be linear or branched.

The alkyl group represented by $R^{IM1}$ to $R^{IM4}$ and $R^{MO1}$ is preferably an alkyl group having 1 or more and 6 or less carbon atoms, and more preferably an alkyl group having 1 or more and 4 or less carbon atoms.

The organic amine compound is preferably a compound having a boiling point of 60° C. or higher (more preferably 60° C. or higher and 200° C. or lower, and still more preferably 70° C. or higher and 150° C. or lower). When the boiling point of the organic amine compound is 60° C. or higher, during the storage, the volatilization of the organic amine compound from the polyimide precursor solution may be prevented, and the decrease in solubility of the polyimide precursor in the solvent may be easily prevented.

The organic amine compound is preferably contained in an amount of 50 mol % or more and 500 mol % or less, more preferably 80 mol % or more and 250 mol % or less, and still more preferably 90 mol % or more and 200 mol % or less, with respect to the carboxy group (—COOH) of the polyimide precursor in the polyimide precursor solution.

When the content of the organic amine compound is within the above range, the solubility of the polyimide precursor in a solvent may be easily increased, and the film-forming property may be easily improved. In addition, the storage stability of the polyimide precursor solution may be also easily improved.

The above organic amine compounds may be used alone or in combination of two or more thereof.

(Other Additives)

The polyimide precursor solution according to the present exemplary embodiment may contain a catalyst for promoting an imidization reaction, a leveling material for improving the quality of film formation, and the like.

As the catalyst for promoting the imidization reaction, a dehydrating agent such as an acid anhydride, an acid catalyst such as a phenol derivative, a sulfonic acid derivative, or a benzoic acid derivative may be used.

The polyimide precursor solution may contain, as a material other than the inorganic particles having a volume average particle diameter of 0.001 μm or more and 0.2 μm or less, a conductive material (specifically, conductive material (for example, having a volume resistivity of less than $10^7$ Ω·cm) or a semi-conductive material (for example, having a volume resistivity of $10^7$ Ω·cm or more and $10^{13}$ Ω·cm or less)) as a conductive agent added for imparting conductivity, for example, depending on the intended use.

Examples of the conductive agent include: carbon black (for example, acidic carbon black having a pH of 5.0 or less); metals (for example, aluminum or nickel); metal oxides (for example, yttrium oxide or tin oxide); and ionic conductive materials (for example, potassium titanate or LiCl). The conductive materials may be used alone or in combination of two or more thereof.

(Viscosity Properties of Polyimide Precursor Solution)

The viscosity of the polyimide precursor solution according to the present exemplary embodiment differs in preferred viscosity depending on the coating method. For example, when the temperature of the polyimide precursor solution is 20° C. or higher and 25° C. or lower, and the solid content concentration of the polyimide precursor solution is 5 mass % or more and 20 mass % or less, the viscosity of the polyimide precursor solution is preferably 50 Pa·s or more and 400 Pa·s or less, more preferably 100 Pa·s or more and 350 Pa·s or less, and still more preferably 150 Pa·s or more and 300 Pa·s or less.

The viscosity of the polyimide precursor solution is measured with a No. 3 rotor 3°×R14 on an E-type viscometer TV-H manufactured by Toki Sangyo Co., Ltd.

When the polyimide precursor solution has the viscosity properties, a dried film having good coatability and high strength is easily obtained while ensuring the dispersibility of particles.

<Method for Producing Porous Polyimide Film>

Hereinafter, an example of a preferred method for producing the porous polyimide film according to the present exemplary embodiment will be described.

The method for producing a porous polyimide film according to the present exemplary embodiment includes, for example, the following steps. A first step of coating a polyimide precursor solution to form a coating film, and then drying the coating film to form a film containing the polyimide precursor and the particles.

A second step of forming a polyimide film by heating the film to imidize the polyimide precursor, the second step including a treatment of removing the particles.

FIG. 1 referred to in the description of the production method is a schematic view showing a configuration of the porous polyimide film according to the present exemplary embodiment.

In FIG. 1, the same components are designated by the same reference numerals. In reference numerals in FIG. 1, 31 denotes a substrate, 51 denotes a release layer, 10A denotes a pore, and 10 denotes a porous polyimide film.

(First Step)

In the first step, a polyimide precursor solution is prepared.

The method for producing the polyimide precursor solution will be described in detail below. As an example, the method for producing a polyimide precursor solution containing resin particles as particles will be described.

Examples of the method for producing the polyimide precursor solution according to the present exemplary embodiment include the methods according to (i) and (ii) below (i) a method of mixing and dispersing resin particles (powder or organic solvent dispersion liquid) after preparing the polyimide precursor solution before dispersing the resin particles (ii) a method of synthesizing a polyimide precursor in an organic solvent dispersion liquid of resin particles (i) Method of Mixing and Dispersing Resin Particles After Preparing Polyimide Precursor Solution Before Dispersing Resin Particles First, the polyimide precursor solution before dispersing the resin particles is obtained by polymerizing as tetracarboxylic dianhydride and a diamine compound in an organic solvent to produce a resin (that is, polyimide precursor) using a known method.

Next, the resin particles described above are mixed with the obtained polyimide precursor solution before dispersing the resin particles, and the mixture is stirred. Alternatively, the resin particles may be redispersed in an organic solvent that does not dissolve the resin particles (either alone or in a mixed solvent), and then mixed and stirred with the polyimide precursor solution.

The method of mixing, stirring and dispersing is not particularly limited. Further, in order to improve the dispersibility of the resin particles, a known nonionic or ionic surfactant may be added.

(ii) Method of Synthesizing Polyimide Precursor in Organic Solvent Dispersion Liquid of Resin Particles First, a solution in which the resin particles are dispersed in an organic solvent in which the resin particles are not dissolved and the polyimide precursor is dissolved is prepared. Next, in the solution, a tetracarboxylic dianhydride and a diamine compound are polymerized to form a resin (that is, polyimide precursor), and an organic solvent solution of the polyimide precursor is obtained.

The polyimide precursor solution obtained by the above method is coated onto a substrate to form a coating film containing the polyimide precursor solution and the particles. Then, the coating film formed on the substrate is dried to form a film containing the polyimide precursor and the particles.

The substrate on which the polyimide precursor solution is coated is not particularly limited. Examples thereof include a resin substrate made of polystyrene, polyethylene terephthalate or the like; a glass substrate; a ceramic substrate; a metallic substrate made of iron, stainless steel (SUS) or the like; and a composite material substrate made of a material combining the above materials. If necessary, the substrate may be provided with a release layer by performing a release treatment with, for example, a silicone or fluorine release agent.

The method of coating the polyimide precursor solution onto the substrate is not particularly limited. Examples thereof include various methods such as a spray coating method, a rotary coating method, a roll coating method, a bar coating method, a slit die coating method, and an inkjet coating method.

The coating amount of the polyimide precursor solution for obtaining the coating film containing the polyimide precursor solution and the particles may be set to an amount that can obtain a predetermined film thickness.

After the coating film containing the polyimide precursor solution and the particles is formed, the coating film is dried to form a film containing the polyimide precursor and the particles. Specifically, the film is formed by drying the coating film containing the polyimide precursor solution and the particles by, for example, a method such as heat drying, natural drying, or vacuum drying. More specifically, the film is formed by drying the coating film such that the solvent remaining in the film is 50% or less, preferably 30% or less with respect to the solid content of the film.

(Second Step)

The second step is a step of heating the film containing the polyimide precursor and the particles obtained in the first step to imidize the polyimide precursor to form a polyimide film. The second step includes a treatment of removing particles. After the treatment for removing the particles, a porous polyimide film is obtained.

In the second step, specifically, in the step of forming the polyimide film, the film containing the polyimide precursor and the particles obtained in the first step is heated to progress imidization, and heating is further performed to form a polyimide film that has undergone imidization. As the imidization progresses and the imidization rate increases, the polyimide precursor is difficult to dissolve in an organic solvent.

Then, in the second step, a treatment of removing particles is performed. The particles may be removed in the process of heating the film to imidize the polyimide precursor, or may be removed from the polyimide film after the imidization is completed.

In the present exemplary embodiment, the process of imidizing the polyimide precursor indicates a process in which the film containing the polyimide precursor and the particles obtained in the first step is heated to progress imidization, and the polyimide precursor is in a state before the polyimide film is formed after the imidization is completed.

The treatment of removing particles is preferably carried out when the imidization rate of the polyimide precursor in the polyimide film is 10% or more in the process of imidizing the polyimide precursor in terms of particle removability and the like. When the imidization rate is 10% or more, it may be easy to maintain the morphology.

Next, the treatment of removing particles will be described.

First, a treatment of removing resin particles will be described.

Examples of the treatment of removing resin particles include a method of removing the resin particles by heating, a method of removing the resin particles with an organic solvent that dissolves the resin particles, and a method of removing the resin particles by decomposition with a laser or the like. Among these, a method of removing the resin particles by heating and a method of removing the resin particles with an organic solvent that dissolves the resin particles are preferred.

As the method of removing the resin particles by heating, for example, in the process of imidizing the polyimide precursor, the resin particles may be removed by being decomposed by heating for progressing the imidization. In this case, there is no operation of removing the resin particles with a solvent and the number of steps may be reduced.

Examples of the method of removing the resin particles with an organic solvent that dissolves the resin particles include a method of dissolving and removing the resin particles by bringing the resin particles into contact with an organic solvent that dissolves the resin particles (for example, immersing the resin particles in the solvent). Immersion in the solvent in this state is preferred in that the dissolution efficiency of the resin particles is increased.

The organic solvent for dissolving the resin particles and for removing the resin particles is not particularly limited as long as it is all organic solvent that does not dissolve the polyimide film before imidization is completed and the polyimide film after imidization is completed but dissolves the resin particles. Examples thereof include: ethers such as tetrahydrofuran (THF); aromatic substances such as toluene; ketones such as acetone; and esters such as ethyl acetate.

When the resin particles are removed by dissolution and removal to form pores, a general-purpose solvent such as tetrahydrofuran, acetone, toluene, and ethyl acetate is preferred. Water may also be used, depending on the resin particles and the polyimide precursor used.

When the resin particles are removed by beating to form pores, the resin particles are not decomposed at the drying temperature after coating, but are thermally decomposed at a temperature at which the film of the polyimide precursor is imidized. From this viewpoint, the thermal decomposition start temperature of the resin particles is preferably 150° C. or higher and 320° C. or lower, more preferably 180° C. or higher and 300° C. or lower, and still more preferably 200° C. or higher and 280° C. or lower.

Here, a treatment of removing inorganic particles when the polyimide precursor solution contains inorganic particles will be described.

Examples of the treatment of removing inorganic particles include a method of removing the inorganic particles using a liquid that dissolves the inorganic particles but does not dissolve the polyimide precursor or the polyimide (hereinafter, may be referred to as "particle removing liquid"). The particle removing liquid is selected depending on the inorganic particles used. Examples thereof include: an aqueous solution of acids such as hydrofluoric acid, hydrochloric acid, hydrobromic acid, boric acid, perchloric acid, phosphoric acid, sulfuric acid, nitric acid, acetic acid, trifluoroacetic acid, and citric acid; and an aqueous solution of bases such as sodium hydroxide, potassium hydroxide, tetramethylammonium hydroxide, sodium carbonate, potassium carbonate, ammonia, and the above organic amines. Water alone may be used, depending on the inorganic particles and the polyimide precursor used.

Ta the second step, the heating method for heating the film obtained in the first step to progress imidization to obtain a polyimide film is not particularly limited. For example, a method of heating in two stages may be mentioned. In the case of heating in two stages, specific heating conditions include the following.

The heating condition in the first stage is preferably a temperature at which the shape of the particles is maintained. Specifically, for example, the heating temperature is preferably in the range of 50° C. or higher and 150° C. or lower, and preferably in the range of 60° C. or higher and 140° C. or lower. The heating time is preferably in the range of 10 minutes or longer and 60 minutes or shorter. The higher the heating temperature, the shorter the heating time may be.

Examples of the heating conditions in the second stage include heating at 150° C. or higher and 450° C. or lower (preferably 200° C. or higher and 430° C. or lower) for 20 minutes or longer and 120 minutes or shorter. When the heating conditions are set within these ranges, the imidization reaction further progresses, and a polyimide film is obtained. During the heating reaction, the temperature is preferably gradually increased stepwise or at a constant rate before the final temperature of heating is reached.

The heating conditions are not limited to the above two-stage heating method, and for example, a one-stage heating method may be adopted. In the case of the one-stage heating method, for example, the imidization may be completed only under the beating conditions shown in the second stage above.

In the second step, from the viewpoint of increasing the porosity, it is preferable to perform a treatment of exposing the particles to make the particles in an exposed state. In the second step, the treatment of exposing the particles is preferably performed after the process of imidizing the polyimide precursor or after the imidization and before the treatment of removing particles.

In this case, for example, when forming a film on a substrate using the polyimide precursor solution, the polyimide precursor solution is coated onto the substrate to form a coating film in which particles are embedded. Next, the coating film is dried to form a film containing a polyimide precursor and particles. The film formed by this method is in a state where particles are embedded. This film may be subjected to the treatment of exposing the particles from the polyimide film in the process of imidizing the polyimide precursor before heating and removing the particles or after the imidization is completed.

In the second step, the treatment of exposing the particles may be performed, for example, when the polyimide film is in the following state.

In a case where the treatment of exposing, the particles is performed when the imidization ratio of the polyimide precursor in the polyimide film is less than 10% (that is, the polyimide precursor is dissoluble in a solvent), examples of the treatment of exposing the particles embedded in the polyimide film include a wiping treatment and an immersing treatment in a solvent. The solvent used at this time may be the same as or different from the solvent used for the polyimide precursor solution of the present exemplary embodiment.

In a case where the treatment of exposing the particles is performed when the imidization ratio of the polyimide precursor in the polyimide film is 10% or more (that is, it is difficult to dissolve the polyimide precursor in water or an organic solvent), and when the polyimide film is in a state where imidization is completed, examples include a method of mechanically cutting with tools such as sandpaper to expose the particles, and a method of decomposing the particles with a laser or the like to expose the resin particles when the particles are resin particles.

For example, in the case of mechanical cutting, a part of the particles present in the upper region (that is, the region on the side of the particles away from the substrate) of the particles embedded in the polyimide film is cut together with the polyimide film present on the upper part of the particles, and the cut particles are exposed from the surface of the polyimide film.

Thereafter, the particles are removed from the polyimide film with exposed particles by the above treatment of removing particles. Then, a porous polyimide film from which the particles have been removed is obtained (see FIG. 1).

In the above, the process of producing the porous polyimide film which has been subjected to the treatment of exposing the particles in the second step has been described. However, in order to increase the porosity, the treatment of exposing the particles may be performed in the first step. In this case, in the first step, after obtaining the coating film, the particles may be exposed in the process of forming a film by drying to make the particles in an exposed state. By performing the treatment of exposing the particles, the porosity of the porous polyimide film is increased.

For example, in the process of obtaining a coating film containing a polyimide precursor solution and particles and then drying the coating film to form a film containing the polyimide precursor and the particles, as described above, the film is in a state where the polyimide precursor is dissoluble in a solvent. When the film is in this state, the particles may be exposed by, for example, a wiping treatment or an immersing treatment in a solvent. Specifically, when a treatment is performed to expose a particle layer by wiping, for example, with a solvent, the polyimide precursor solution present in a region equal to or larger than the thickness of the particle layer, the polyimide precursor solution present in the region equal to or larger than the thickness of the particle layer is removed. Then, the particles present in the upper region of the particle layer (that is, the region on the side of the particle layer away from the substrate) are exposed from the surface of the film.

In the second step, the substrate for forming the above film used in the first step may be peeled off when the film becomes a dried film, when the polyimide precursor is difficult to dissolve in an organic solvent, or when the imidization is completed and the film is formed.

After the above steps, a porous polyimide film is obtained. Then, the porous polyimide film may be post-processed.

Here, the imidization ratio of the polyimide precursor will be described.

Examples of a partially imidized polyimide precursor include a precursor having a structure having at repeating unit represented by the following general formula (V-1), the following general formula (V-2), and the following general formula (V-3).

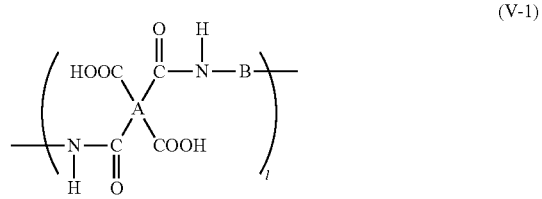

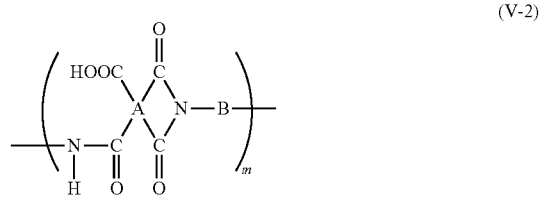

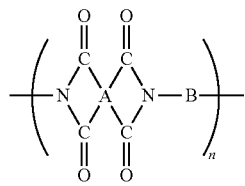

(V-3)

In the general formula (V-1), the general formula (V-2), and the general formula (V-3), A and B have the same meaning as A and B in the formula (I). l represents an integer of 1 or more, and m and n independently represent an integer of 0 or 1 or more.

The imidization ratio of the polyimide precursor represents the ratio of the number of imide-ring-closed bond parts (2n+m) to the total number of bonds (2l+2m+2n) in the bonding part of the polyimide precursor which is a reaction part of the tetracarboxylic dianhydride and the diamine compound. That is, the imidization ratio of the polyimide precursor is indicated by "(2n+m)/(2l+2m+2n)".

The imidization ratio of the polyimide precursor (value of "(2n+m)/(2l+2m+2n)") is measured by the following method.

Measurement of Imidization Ratio of Polyimide Precursor

Preparation of Polyimide Precursor Sample
(i) A polyimide precursor solution to be measured is coated onto a silicon wafer in a film thickness range of 1 μm or more and 10 μm or less to prepare a coating film sample.
(ii) The coating film sample is immersed in tetrahydrofuran (THF) for 20 minutes to replace the solvent in the coating film sample with tetrahydrofuran (THF). The solvent for immersion is not limited to THF, and may be selected from a solvent that does not dissolve the polyimide precursor and may be miscible with the solvent component contained in the polyimide precursor solution. Specifically, alcohol solvents such as methanol and ethanol, and ether compounds such as dioxane may be used.
(iii) The coating film sample is taken out from the THF, and $N_2$ gas is sprayed onto the THF adhering to the surface of the coating film sample to remove the THF. A treatment is performed for 12 hours or longer in a range of 5° C. or higher and 25° C. or lower under a reduced pressure of 10 mmHg or less to dry the coating film sample, so as to prepare a polyimide precursor sample.

Preparation of 100% Imidized Standard Sample
(iv) In the same manner as in the (i) above, a polyimide precursor solution to be measured is coated onto a silicon wafer to prepare a coating film sample.
(v) The coating film sample is heated at 380° C. for 60 minutes to carry out an imidization reaction to prepare a 100% imidized standard sample.

Measurement and Analysis
(vi) Infrared absorption spectra of the 100% imidized standard sample and the polyimide precursor sample are measured using a Fourier transform infrared spectrophotometer (FT-730, manufactured by HORIBA, Ltd.). The ratio (100) of the absorption peak (Ab'(1780 cm⁻)) derived from the nude bond near 1780 cm⁻¹ to the absorption peak (Ab'(1500 cm⁻)) derived from the aromatic ring near 1500 cm⁻¹ in the 100% imidized standard sample is determined.
(vii) Similarly, the polyimide precursor sample is measured, and the ratio I(x) of the absorption peak (1780 cm⁻¹) derived from the imide bond near 1780 cm⁻¹ to the absorption peak (1500 cm⁻¹) derived from the aromatic ring: near 1500 cm⁻¹ is determined.

Then, using the measured absorption peaks I' (100) and I(x), the imidization ratio of the polyimide precursor is calculated based on the following equation.

| Imidization ratio of polyimide precursor=$I(x)/I'(100)$ | Equation |
|---|---|
| $I'(100)=(Ab'(1780\ cm^{-1}))/(Ab'(1500\ cm^{-1}))$ | Equation |
| $I(x)=(Ab(1780\ cm^{-1}))/(Ab(1500\ cm^{-1}))$ | Equation |

The measurement of the imidization ratio of the polyimide precursor is applied to the measurement of the imidization ratio of an aromatic polyimide precursor. When measuring the imidization ratio of an aliphatic polyimide precursor, a peak derived from a structure that does not change before and after the imidization reaction is used as an internal standard peak instead of the absorption peak of the aromatic ring.

<Porous Polyimide Film>

Hereinafter, the porous polyimide film of the present exemplary embodiment will be described.

The porous polyimide film of the present exemplary embodiment is produced by the above method for producing a porous polyimide film according to the present exemplary embodiment.

The porous polyimide film is not particularly limited, and the porosity is preferably 30% or more, more preferably 40% or more, and still more preferably 50% or more. The upper limit of the porosity is not particularly limited, and is preferably in the range of 90% or less.

The shape of the pores is preferably spherical or close to spherical. Further, it is preferable that the pores have a continuous shape in which the pores are connected to each other. The pore diameter of the part where the pores are connected to each other is, for example, preferably 1/100 or more and 1/2 or less, more preferably 1/50 or more and 1/3 or less, and still more preferably 1/20 or more and 1/4 or less of the maximum pore diameter. Specifically, the average value of the pore diameter of the part where the pores are connected to each other is preferably 5 nm or more and 1500 nm or less.

The pore diameter of the pores of the porous polyimide film is preferably in the range of 0.1 μm or more and 1 μm or less, more preferably in the range of 0.12 μm or more and 0.98 μm or less, and still more preferably in the range of 0.14 μm or more and 0.96 μm or less.

The pore diameter of the pores of the porous polyimide film is not limited to the above range, and is preferably changed according to the use of the porous polyimide film.

The porous polyimide film of the present exemplary embodiment has a ratio of the maximum diameter to the minimum diameter of the pores, that is, a ratio of the maximum value to the minimum value of the pore diameter of preferably 1 or more and 2 or less, more preferably 1 or more and 1.9 or less, and still more preferably 1 or more and 1.8 or less. Among this range, the ratio is more preferably close to 1. Within this range, a variation in pore diameter may be prevented. Further, when the porous polyimide film of the present exemplary embodiment is applied to, for example, a battery separator of a lithium ion battery, the occurrence of turbulence in the ion flow may be prevented, so that the formation of lithium dendrites may be easily prevented. The "ratio of the maximum diameter to the minimum diameter of the pores" is a ratio represented by a value obtained by dividing the maximum diameter of the pores by the minimum diameter of the pores (that is, the maximum value/the minimum value of the pore diameter).

The pore diameter and the pore diameter of the part where the pores are connected to each other are values observed and measured by a scanning electron microscope (SEM). Specifically, first, a porous polyimide film is cut out and a measurement sample is prepared. Then, the measurement sample is observed and measured by VE SEM manufactured by KEYENCE CORPORATION using image processing software included in the VE SEM as standard. The observation and measurement are performed on 100 pore parts in the cross section of the measurement sample, and the average value, the minimum diameter, the maximum diameter, and the arithmetic average diameter are obtained. When the shape of the pore is not circular, the longest part is the diameter.

The film thickness of the porous polyimide film is not particularly limited, and is preferably 15 μm or more and 500 μm or less.

The film thickness of the porous polyimide film is measured in an environment of 23° C.±1° C. using a length measuring device (high-precision digital length measuring device MINIAX PH-13 and display unit DH-150, both manufactured by Tokyo Seimitsu Co., Ltd.).

(Use of Porous Polyimide Film)

Examples of the use of the porous polyimide film according to the present exemplary embodiment include; battery separators for lithium batteries, etc.; separators for electrolytic capacitors; electrolyte membranes for fuel cells, etc.; battery electrode materials; gas or liquid separation membranes; low dielectric constant materials; and filtration membrane.

<Lithium Ion Secondary Battery>

A lithium ion secondary battery provided with the porous polyimide film according to the present exemplary embodiment as a separator for a lithium ion secondary battery will be described with reference to FIG. 2.

Figure 2:
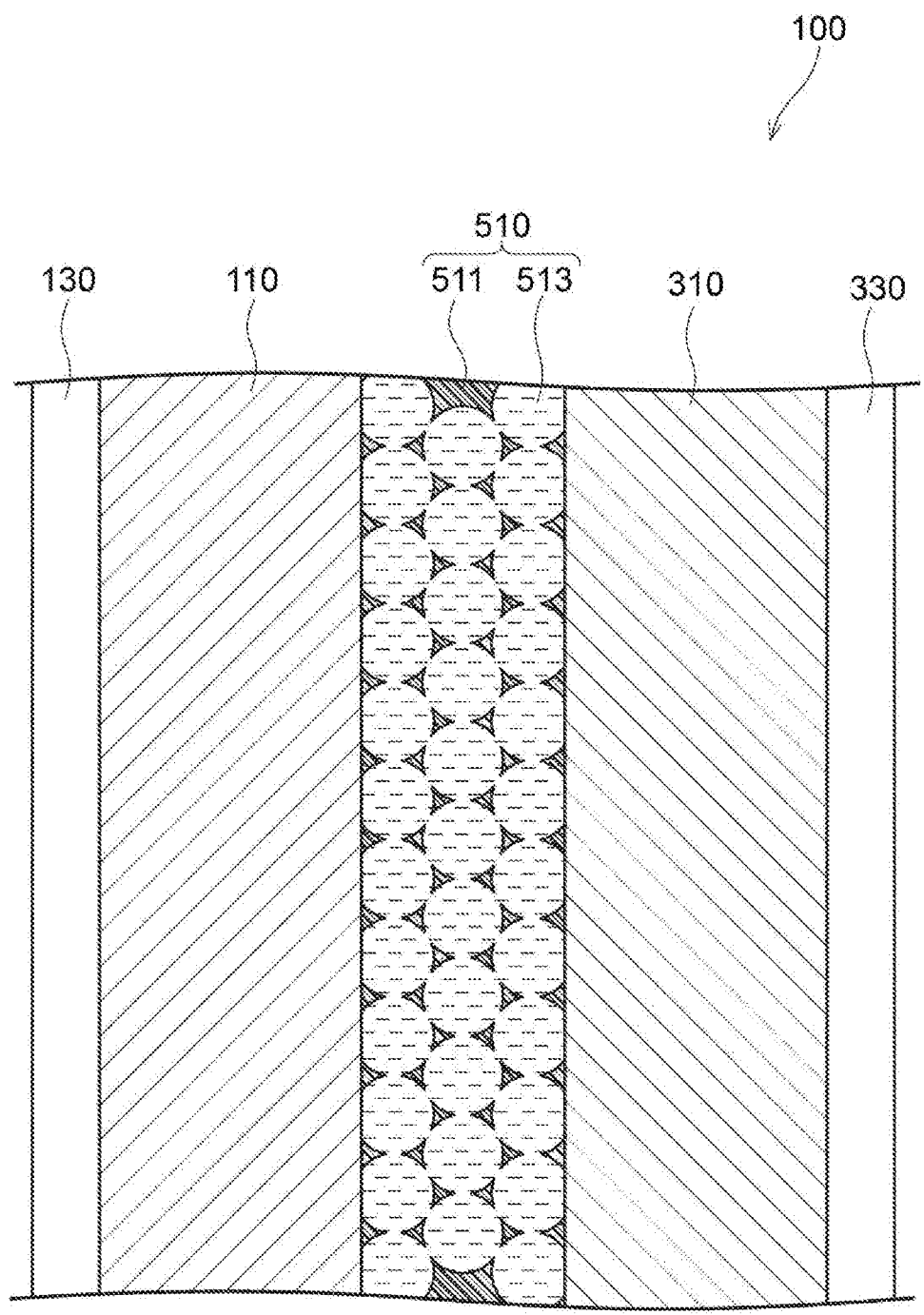
FIG. 2 is a schematic partial cross-sectional view showing an example of a lithium ion secondary battery provided with the porous polyimide film according to the present exemplary embodiment as a separator for a lithium ion secondary battery.

FIG. 2 is a schematic: partial cross-sectional view showing an example of a lithium ion secondary battery to which a separator for a lithium ion secondary battery is applied.

As shown in FIG. 2, a lithium ion secondary battery 100 includes a positive electrode active material layer 110, a separator layer 510, and a negative electrode active material layer 310 housed inside an exterior member (not shown). The positive electrode active material layer 110 is provided on a positive electrode current collector 130, and the negative electrode active material layer 310 is provided on a negative electrode current collector 330. The separator layer 510 is provided to separate the positive electrode active material layer 110 and the negative electrode active material layer 310, and is arranged between the positive electrode active material layer 110 and the negative electrode active material layer 310 such that the positive electrode active material layer 110 and the negative electrode active material layer 310 face each other. The separator layer 510 includes a separator 511 and an electrolytic solution 513 filled inside the pores of the separator 511. The porous polyimide film according to the present exemplary embodiment is applied to the separator 511. The positive electrode current collector 130 and the negative electrode current collector 330 are members provided if necessary.

(Positive Electrode Current Collector 130 and Negative Electrode Current Collector 330)

The material for use in the positive electrode current collector 130 and the negative electrode current collector 330 is not particularly limited, and any known conductive material may be used. For example, metals such as aluminum, copper, nickel and titanium may be used.

(Positive Electrode Active Material Layer 110)

The positive electrode active material layer 110 is a layer containing: a positive electrode active material. If necessary, known additives such as a conductive auxiliary and a hinder resin may be contained. The positive electrode active material is not particularly limited, and a known positive electrode active material is used. Examples thereof include lithium-containing composite oxides ($LiCoO_2$, $LiMnO_2$, $LiMn_2O_4$, $LiFeMnO_4$, $LiV_2O_5$, etc.), lithium-containing phosphates ($LiFePO_4$, $LiCoPO_4$, $LiMnPO_4$, $LiNiPO_4$, etc.) and conductive polymers (polyacetylene, polyaniline, polypyrrole, polythiophene, etc.). The positive electrode active materials may be used alone or in combination of two or more thereof.

(Negative Electrode Active Material Layer 310)

The negative electrode active material layer 310 is a layer containing a negative electrode active material. If necessary, known additives such as a binder resin may be contained. The negative electrode active material is not particularly limited, and a known positive electrode active material is used. Examples thereof include carbon materials (graphite (natural graphite, artificial graphite), carbon nanotubes, graphitized carbon, low temperature calcined carbon, etc.), metals (aluminum, silicon, zirconium, titanium, etc.), and metal oxides (tin dioxide, lithium titanate, etc.). The negative electrode active materials may be used alone or in combination of two or more thereof.

(Electrolytic Solution 513)

Examples of the electrolytic solution 513 include a non-aqueous electrolyte solution containing an electrolyte and a non-aqueous solvent.

Examples of the electrolyte include lithium salt electrolytes ($LiPF_6$, $LiBF_4$, $LiSbF_6$, $LiAsF_6$, $LiClO_4$, $LiN(FSO_2)_2$, $LiN(CF_3SO_2)_2$, $LiN(C_2F_5SO_2)$, and $LiC(CF_3SO_2)_3$. The electrolytes may be used alone or in combination of two or more thereof.

Examples of the non-aqueous solvent include cyclic carbonates (ethylene carbonate, propylene carbonate, butylene carbonate, etc.), and chain carbonates (diethyl carbonate, dimethyl carbonate, ethyl methyl carbonate, methyl acetate, ethyl acetate, methyl propionate, ethyl propionate, γ-butyrolactone, 1,2-dimethoxyethane, 1,2-diethoxyethane, etc.). The non-aqueous solvents may be used alone or in combination of two or more thereof.

(Method for Producing Lithium ion Secondary Battery 100)

An example of a method for producing the lithium ion secondary battery 100 will be described.

A coating liquid for forming the positive electrode active material layer 110 containing the positive electrode active material is coated onto and dried on the positive electrode current collector 130 to obtain a positive electrode having the positive electrode active material layer 110 provided on the positive electrode current collector 130.

Similarly, the coating liquid for forming the negative electrode active material layer 310 containing the negative electrode active material is coated onto and dried on the negative electrode current collector 330 to obtain a negative electrode having the negative electrode active material layer 310 provided on the negative electrode current collector 330. The positive electrode and the negative electrode may be subjected to compression processing, if necessary.

Next, the separator 511 is arranged between the positive electrode active material layer 110 of the positive electrode and the negative electrode active material layer 310 of the negative electrode such that the positive electrode active material layer 110 of the positive electrode and the negative electrode active material layer 310 of the negative electrode face each other, thereby forming a laminated structure. In the laminated structure, the positive electrode current collector 130, the positive electrode active material layer 110, the separator layer 510, the negative electrode active material layer 310, and the negative electrode current collector 330 are laminated in this order. At this time, the laminated structure may be subjected to compression processing, if necessary.

Next, the laminated structure is housed in an exterior member, and then the electrolytic solution 513 is injected into the laminated structure. The injected electrolytic solution 513 penetrates into the pores of the separator 511.

Thus, the lithium ion secondary battery 100 is obtained.

<All-Solid-State Battery>

Next, an all-solid-state battery to which the porous polyimide film according to the present exemplary embodiment is applied will be described. Hereinafter, description will be made with reference to FIG. 3.

Figure 3:
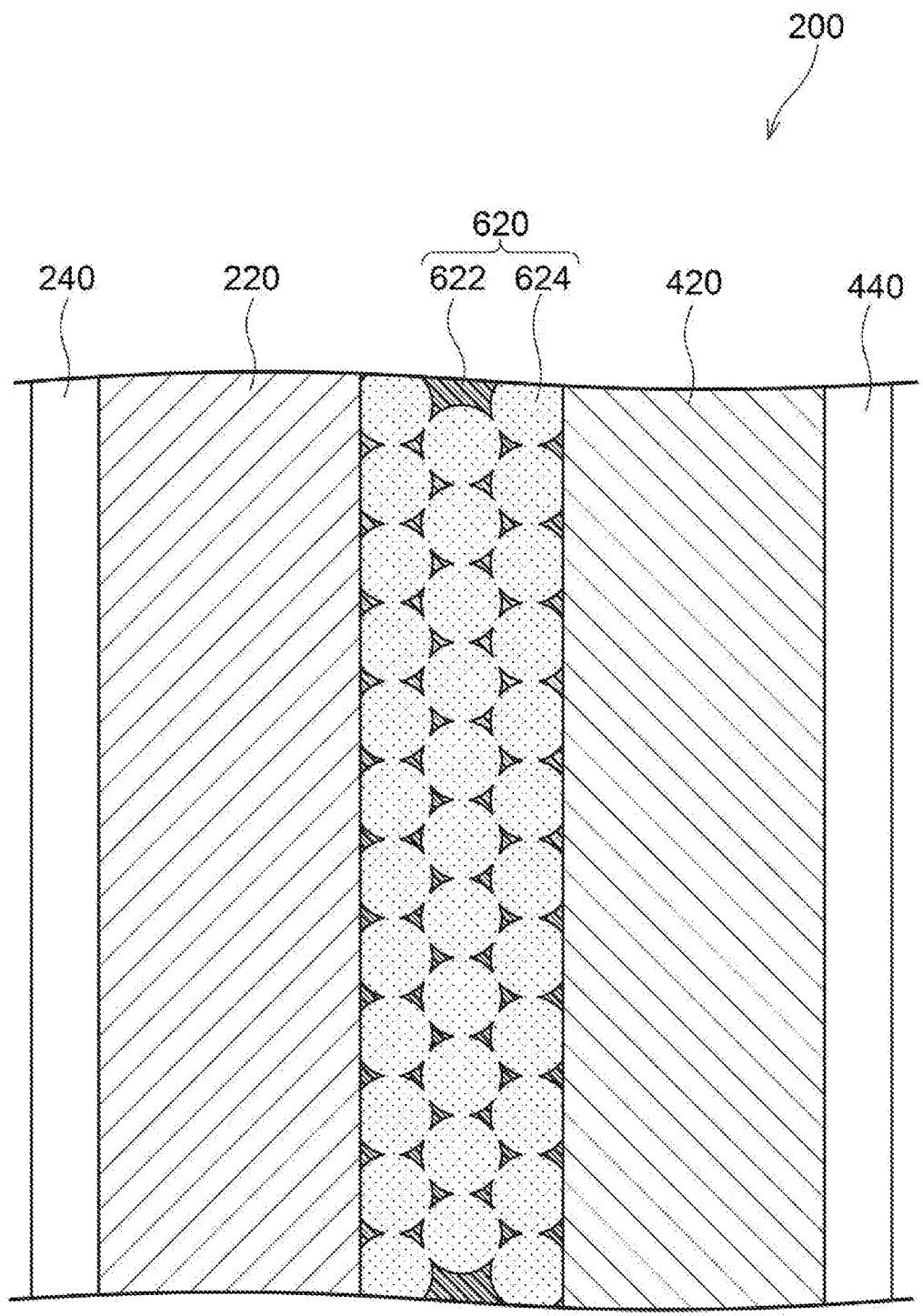
FIG. 3 is a schematic partial cross-sectional view showing an example of an all-solid-state battery provided with the porous polyimide film according to the present exemplary embodiment.

FIG. 3 is a schematic partial cross-sectional view showing an example of the all-solid-state battery according to the present exemplary embodiment. As shown in FIG. 3, an all-solid-state battery 200 includes a positive electrode active material layer 220, a solid electrolyte layer 620, and a negative electrode active material layer 420 housed inside an exterior member (not shown). The positive electrode active material layer 220 is provided on a positive electrode current collector 240, and the negative electrode active material layer 420 is provided on a negative electrode current collector 440. The solid electrolyte layer 620 is arranged between the positive electrode active material layer 220 and the negative electrode active material layer 420 such that the positive electrode active material layer 220 and the negative electrode active material layer 420 face each other. The solid electrolyte layer 620 includes a solid electrolyte 624 and a holding body 622 that holds the solid electrolyte 624, and the solid electrolyte 624 is filled inside the pores of the holding body 622. The porous polyimide film according to the present exemplary embodiment is applied to the holding body 622 that holds the solid electrolyte 624. The positive electrode current collector 240 and the negative electrode current collector 440 are members provided if necessary.

(Positive Electrode Current Collector 240 and Negative Electrode Current Collector 440)

Examples of the material for use in the positive electrode current collector 240 and the negative electrode current collector 440 include the same materials as those described in the above lithium ion secondary battery.

(Positive Electrode Active Material Layer 220 and Negative Electrode Active Material Layer 420)

Examples of the material for use in the positive electrode active material layer 220 and the negative electrode active material layer 420 include the same materials as those described in the above lithium ion secondary battery.

(Solid Electrolyte 624)

The solid electrolyte 624 is not particularly limited, and examples thereof include known solid electrolytes. Examples thereof include a polymer solid electrolyte, an oxide solid electrolyte, a sulfide solid electrolyte, a halide solid electrolyte, and a nitride solid electrolyte.

Examples of the polymer solid electrolyte include fluororesins (homopolymers such polyvinylidene fluoride, polyhexafluoropropylene, and polytetrafluoroethylene, copolymers having the above as structural units, etc.), polyethylene oxide resins, polyacrylonitrile resins, and polyacrylate resins. The sulfide solid electrolyte is preferably contained because of having excellent lithium ion conductivity. In the same respect, it is preferable to contain a sulfide solid electrolyte containing sulfur and at least one of lithium and phosphorus as constituent elements.

Examples of the oxide solid electrolyte include oxide solid electrolyte particles containing lithium. Examples thereof include $Li_2O$—$B_2O_3$—$P_2O_5$ and $Li_2O$—$SiO_2$.

Examples of the sulfide solid electrolyte include a sulfide solid electrolyte containing sulfur and at least one of lithium and phosphorus as constituent elements. Examples thereof include $8Li_2O \cdot 67Li_2S \cdot 25P_2S_5$, $Li_2S$, $P_2S_5$, $Li_2S$—$SiS_2$, $LiI$—$Li_2S$—$P_2S_5$, $LiI$—$Li_3PO_4$—$P_2S_5$, $LiI$—$Li_2S$—$P_2O_5$, and $LiI$—$Li_2S$—$B_2S_3$.

Examples of the halide solid electrolyte include LiI.

Examples of the nitride solid electrolyte include $Li_3N$.

(Method for Producing All-Solid-State Battery 200)

An example of a method for producing the all-solid-state battery 200 will be described.

A coating liquid for forming the positive electrode active material layer 220 containing the positive electrode active material is coated onto and dried on the positive electrode current collector 240 to obtain a positive electrode having the positive electrode active material layer 220 provided on the positive electrode current collector 240.

Similarly, the coating liquid for forming the negative electrode active material layer 420 containing the negative electrode active material is coated onto and dried on the negative electrode current collector 440 to obtain a negative electrode having the negative electrode active material layer 420 provided on the negative electrode current collector 440.

The positive electrode and the negative electrode may be subjected to compression processing, if necessary.

Next, a coating liquid containing the solid electrolyte 624 for forming the solid electrolyte layer 620 is coated onto a substrate and dried to form a layered solid electrolyte.

Next, as a material for forming the solid electrolyte layer 620, a polyimide film (the porous polyimide film according to the present exemplary embodiment) as the holding body 622 and the layered solid electrolyte 624 are superposed on the positive electrode active material layer 220 of the positive electrode. Further, the negative electrode is superposed on the material for forming the solid electrolyte layer 620 such that the negative electrode active material layer 420 of the negative electrode faces the positive electrode active material layer 220, thereby forming a laminated structure. In the laminated structure, the positive electrode current collector 240, the positive electrode active material layer 220, the solid electrolyte layer 620, the negative electrode active material layer 420, and the negative electrode current collector 440 are laminated in this order.

Next, the laminated structure is subjected to compression processing, and the pores of the polyimide film which is the holding body 622 are impregnated with the solid electrolyte 624 to hold the solid electrolyte 624.

Next, the laminated structure is housed in an exterior member.

Thus, the all-solid-state battery 200 is obtained.

EXAMPLES

Hereinafter, Examples will be described, but the present invention is not limited to these Examples at in the following description, all "parts" and "%" are based on mass unless otherwise specified.

<Preparation of Particle Dispersion Liquid>
(Preparation of PSt Particle Dispersion Liquid-1)

670 parts by mass of styrene, 12.1 parts by mass of a surfactant Dowfax2A1 (a 47% solution, manufactured by Dow Chemical Company), and 670 parts by mass of ion-exchanged water are mixed, and the mixture is stirred and emulsified at 1,500 rpm for 30 minutes with a dissolver to prepare a monomeric emulsion liquid.

To the reaction vessel, 1.10 parts by mass of Dowfax2A1 (a 47% solution, manufactured by Dow Chemical Company) and 1500 parts by mass of ion-exchanged water are charged. After heating to 75° C. under a nitrogen stream, 70 parts by mass of the monomeric emulsion liquid is added, and then, a polymerization initiator solution in which 15 parts by mass of ammonium persulfate is dissolved in 98 parts by mass of ion-exchanged water is added dropwise over 10 minutes. After the dropwise addition, the mixture is allowed to react for 50 minutes, then the remaining monomeric emulsion liquid is added dropwise over 220 minutes, and the mixture is further reacted for 50 minutes, followed by cooling to obtain a PSt particle dispersion liquid-1. The average particle diameter of the resin particles is 0.81 μm.

Example 1

A flask equipped with a stir bar, a thermometer, and a dropping funnel is idled with 850 g of water. To the flask, 27.28 g (252.27 mmol) of p-phenylenediamine (molecular weight: 108.14) and 50.00 g (494.32 mmol) of N-methylmorpholine (organic amine compound) are added, and the mixture is stirred at 20° C. for 10 minutes for dispersion. Further, to this solution, 72.72 g (247.16 mmol) of 3,3',4,4'-biphenyltetracarboxylic dianhydride (molecular weight: 294.22) is added, and the mixture is dissolved and reacted by stirring for 12 hours while maintaining the reaction temperature at 50° C., to obtain a high molecular weight polyimide precursor solution having a solid content of 10%.

A flask equipped with a stir bar, a thermometer, and a dropping funnel is filled with 850 g of water. To the flask, 27.28 g (252.27 mmol) of p-phenylenediamine (molecular weight: 108.14) and 50.00 g (494.32 mmol) of N-methylmorpholine (organic amine compound) are added, and the mixture is stirred at 20° C. for 10 minutes for dispersion. Further, to this solution, 72.72 g (247.16 mmol) of 3,3',4,4'-biphenyltetracarboxylic dianhydride (molecular weight: 294.22) is added, and the mixture is dissolved and reacted by stirring for 3 hours while maintaining the reaction temperature at 50° C., to obtain a low molecular weight polyimide precursor solution having a solid content of 10%.

Then, the prepared high molecular weight polyimide precursor solution and low molecular weight polyimide precursor solution are mixed while adjusting to have the GPC peak area ratio shown in Table 1 to obtain a polyimide precursor solution. To this polyimide precursor solution, the PSt particle dispersion liquid-1 is added such that the volume content ratio (resin particles/polyimide precursor) of the resin particles to the polyimide precursor is 60/40, and the mixture is stirred on a wave rotor, to obtain a resin particle-dispersed polyimide precursor solution.

Examples 2 to 5

The high molecular weight polyimide precursor solution and low molecular weight polyimide precursor solution prepared in Example 1 are mixed while adjusting to have the GPC peak area ratio shown in Table 1 to obtain a polyimide precursor solution.

Example 6

A resin particle-dispersed polyimide precursor solution is obtained in the same manner as in Example 1 except that the stirring time of the high molecular weight polyimide precursor solution is 10 hours, and the stirring time of the low molecular weight polyimide precursor solution is 6 hours.

Example 7

A resin particle-dispersed polyimide precursor solution is obtained in the same manner as in Example 1 except that the stirring time of the high molecular weight polyimide precursor solution is 20 hours.

Example 8

A polyimide precursor solution is obtained in the same manner as in Example 1 except that the stirring time of the high molecular weight polyimide precursor solution is 18 hours.

Example 9

A polyimide precursor solution is obtained in the same manner as in Example 1 except that 22.28 g (494.32 mmol) of ethylamine (organic amine compound) is added when preparing the high molecular weight polyimide precursor solution, and 22.28 g (494.32 mmol) of ethylamine (organic amine compound) is added when preparing the low molecular weight polyimide precursor solution.

Example 10

A polyimide precursor solution is obtained in the same manner as in Example 1 except that 44.06 g (494.32 mmol) of 2-(ethylamino)ethanol (organic amine compound) is added when preparing the high molecular weight polyimide precursor solution, and 44.06 g (494.32 mmol) of 2-(ethylamino)ethanol (organic amine compound) is added when preparing the low molecular weight polyimide precursor solution.

Example 11

A polyimide precursor solution is obtained in the same manner as in Example 1 except that 44.06 g (494.32 mmol) of dimethylaminoethanol (organic amine compound) is added when preparing the high molecular weight polyimide precursor solution, and 44.06 g (494.32 mmol) of dimethylaminoethanol (organic amine compound) is added when preparing the low molecular weight polyimide precursor solution.

Example 12

A polyimide precursor solution is obtained in the same manner as in Example 1 except that the PSt particle dispersion liquid-1 is added such that the volume content ratio (resin particles/polyimide precursor) of the resin particles to the polyimide precursor is 40/60.

Example 13

A polyimide precursor solution is obtained in the same manner as in Example 1 except that the PSt particle dispersion liquid-1 is added such that the volume content ratio (resin particles/polyamide precursor) of the resin particles to the polyimide precursor is 80/20.

Comparative Example 1

A polyimide precursor solution is obtained in the same manner as in Example 1 except that the stirring time of the high molecular weight polyimide precursor solution is 3 hours, and the stirring time of the low molecular weight polyimide precursor solution is 2 hours.

Comparative Example 2

A polyimide precursor solution is obtained in the same manner as in Example 1 except that the prepared high molecular weight polyimide precursor solution and low molecular weight polyamide precursor solution are mixed while adjusting to have a GPC peak area ratio of a/(a+b)=1.

Comparative Example 3

A polyimide precursor solution is obtained in the same manner as in Example 1 except that the stirring time of the high molecular weight polyimide precursor solution is hours.

Comparative Example 4

A polyimide precursor solution is obtained in the same manner as in Example 1 except that the stirring time of the low molecular weight polyimide precursor solution is 2 hours.

Comparative Example 5

A polyimide precursor solution is obtained in the same manner as in Example 1 except that the stirring time of the high molecular weight polyimide precursor solution is hours, and the stirring time of the low molecular weight polyimide precursor solution is 2 hours.

Comparative Example 6

A polyimide precursor solution is obtained in the same manner as in Example 1 except that the stirring time of the low molecular weight polyimide precursor solution is 8 hours.

Comparative Example 7

A polyimide precursor solution is obtained in the same manner as in Example 1 except that the prepared high molecular weight polyimide precursor solution and low molecular weight polyimide precursor solution, are mixed while adjusting to have a GPC peak area ratio of a/(a+b)=0.5.

<Evaluation>

The polyimide precursor solution of each Example is coated onto a glass substrate having a thickness of 1.0 mm with an applicator in an area of 10 cm×10 cm, and dried in an oven at 80° C. for 30 minutes. The gap of the applicator is adjusted such that the average value of the film thickness of the dried film after drying is 30 μm.

(Evaluation of Surface Unevenness)

The presence or absence of unevenness generated on the surface of the dried film is evaluated using an optical microscope.

A: There is no unevenness on the film surface.
B: Unevenness occurs on a part of the film surface (less than 10% of the film surface area).
C: Unevenness occurs on about half of the film surface.
D: Unevenness occurs on almost the entire surface of the film.

(Evaluation of Strength of Dried Film)

The dried film is cut to a size of 1 cm×8 cm, and the cut dried film is wound around a finger to evaluate the strength of the dried film.

A: The film is wound without collapsing.
B: A part of the film cracks, but the film is wound.
C: The film breaks.

(Dispersibility of Particles)

The obtained resin particle-dispersed polyimide precursor solutions are stored at room temperature (25° C.), and the dispersed state of the resin particles is visually evaluated (when the dispersibility of the resin particles is low, sedimentation of the particles can be observed).

A: No change in solution even over 1 day after the start of storage.
B: Particle sedimentation is observed within more than 1 day and within 1 week after the start of storage.
C: Particle sedimentation is observed within 1 day after the start of storage.

TABLE 1

| | Polyimide precursor | | | | | | |
|---|---|---|---|---|---|---|---|
| | Mw | | | GPC peak area | | | |
| | High molecular weight region A AMw | Low molecular weight region B BMw | AMw − BMw | High molecular weight region A Area a | Low molecular weight region B Area b | GPC peak area ratio a/(a + b) | Type of amine compound |
| Example 1 | 61500 | 15100 | 46400 | 0.88 | 0.12 | 0.88 | N-methylmorpholine |
| Example 2 | 61500 | 15100 | 46400 | 0.9 | 0.1 | 0.9 | N-methylmorpholine |
| Example 3 | 61500 | 15100 | 46400 | 0.98 | 0.02 | 0.98 | N-methylmorpholine |
| Example 4 | 61500 | 15100 | 46400 | 0.71 | 0.29 | 0.71 | N-methylmorpholine |
| Example 5 | 61500 | 15100 | 46400 | 0.6 | 0.4 | 0.6 | N-methylmorpholine |
| Example 6 | 51000 | 29300 | 21700 | 0.88 | 0.12 | 0.88 | N-methylmorpholine |

TABLE 1-continued

| | | | | | | | |
|---|---|---|---|---|---|---|---|
| Example 7 | 95600 | 15100 | 80500 | 0.88 | 0.12 | 0.88 | N-methylmorpholine |
| Example 8 | 86000 | 15100 | 70900 | 0.88 | 0.12 | 0.88 | N-methylmorpholine |
| Example 9 | 60500 | 14900 | 45600 | 0.88 | 0.12 | 0.88 | Ethylamine |
| Example 10 | 61300 | 15300 | 46000 | 0.88 | 0.12 | 0.88 | 2-(ethylamino)ethanol |
| Example 11 | 60800 | 15800 | 45000 | 0.88 | 0.12 | 0.88 | Dimethylaminoethanol |
| Example 12 | 61500 | 15100 | 46400 | 0.88 | 0.12 | 0.88 | N-methylmorpholine |
| Example 13 | 61500 | 15100 | 46400 | 0.88 | 0.12 | 0.88 | N-methylmorpholine |
| Comparative Example 1 | 15100 | 5000 | 10100 | 0.88 | 0.12 | 0.88 | N-methylmorpholine |
| Comparative Example 2 | 61500 | 15100 | 46400 | 1 | 0 | 1 | N-methylmorpholine |
| Comparative Example 3 | 42400 | 15100 | 27300 | 0.88 | 0.12 | 0.88 | N-methylmorpholine |
| Comparative Example 4 | 61500 | 5000 | 56500 | 0.88 | 0.12 | 0.88 | N-methylmorpholine |
| Comparative Example 5 | 42400 | 5000 | 37400 | 0.88 | 0.12 | 0.88 | N-methylmorpholine |
| Comparative Example 6 | 61500 | 42400 | 19100 | 0.88 | 0.12 | 0.88 | N-methylmorpholine |
| Comparative Example 7 | 61500 | 15100 | 46400 | 0.5 | 0.5 | 0.5 | N-methylmorpholine |

| | Volume content ratio of particles to polyimide precursor | Content % of particles (with respect to total amount of polyimide precursor and particles) | Evaluation | | |
|---|---|---|---|---|---|
| | | | Film unevenness | Strength of dried film | Dispersibility of particles |
| Example 1 | 60/40 | 52 | A | A | A |
| Example 2 | 60/40 | 52 | A | A | A |
| Example 3 | 60/40 | 52 | B | A | A |
| Example 4 | 60/40 | 52 | A | A | A |
| Example 5 | 60/40 | 52 | A | A | A |
| Example 6 | 60/40 | 52 | A | A | A |
| Example 7 | 60/40 | 52 | B | A | A |
| Example 8 | 60/40 | 52 | B | A | A |
| Example 9 | 60/40 | 52 | A | A | A |
| Example 10 | 60/40 | 52 | A | A | A |
| Example 11 | 60/40 | 52 | A | A | A |
| Example 12 | 40/60 | 32 | A | A | A |
| Example 13 | 80/20 | 74 | A | B | A |
| Comparative Example 1 | 60/40 | 52 | A | C | C |
| Comparative Example 2 | 60/40 | 52 | D | B | A |
| Comparative Example 3 | 60/40 | 52 | A | C | B |
| Comparative Example 4 | 60/40 | 52 | A | C | B |
| Comparative Example 5 | 60/40 | 52 | A | C | B |
| Comparative Example 6 | 60/40 | 52 | D | B | A |
| Comparative Example 7 | 60/40 | 52 | A | C | C |

From the above results, it can be seen that the polyimide precursor solution of the present Example may obtain a dried film having good coatability and high strength while ensuring the dispersibility of particles, as compared with the polyimide precursor solution of Comparative Example.

Accordingly, it can also be seen that the polyimide precursor solution of the present Example may obtain a porous polyimide film having nearly uniform pores, less surface unevenness, and prevented breakage, as compared with the polyimide precursor solution of Comparative Example.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed:
1. A polyimide precursor solution, comprising:
an aqueous solvent containing water;
particles; and
a polyimide precursor, wherein
the polyimide precursor has a high molecular weight region A containing a high molecular weight side maximum value and a low molecular weight region B containing a tow molecular weight side maximum value in an elution curve obtained by gel permeation chromatography, a weight average molecular weight in the high molecular weight region A is 50,000 or more, a weight average molecular weight in the low molecular weight region B is 10,000 or more and 30,000 or less, and a value of a/(a+b) is 0.60 or more and 0.98 or less wherein a represents an area of the high molecular weight region A and b represents an area of the low molecular weight region B.

2. The polyimide precursor solution according to claim 1, wherein the value of a/(a+b) is 0.70 or more and 0.95 or less.

3. The polyimide precursor solution according to claim 1, wherein a difference between the weight average molecular weight in the high molecular weight region A and the weight average molecular weight in the low molecular weight region B is 20,000 or more and 90,000 or less.

4. The polyimide precursor solution according to claim 2, wherein a difference between the weight average molecular weight in the high molecular weight region A and the weight average molecular weight in the low molecular weight region B is 20,000 or more and 90,000 or less.

5. The polyimide precursor solution according to claim 3, wherein the difference between the weight average molecular weight in the high molecular weight region A and the weight average molecular weight in the low molecular weight region B is 20,000 or more and 70,000 or less.

6. The polyimide precursor solution according to claim 4, wherein the difference between the weight average molecular weight in the high molecular weight region A and the weight average molecular weight in the low molecular weight region B is 20,000 or more and 70,000 or less.

7. The polyimide precursor solution according to claim 1, further comprising: at least one selected from the group consisting of a secondary amine compound and a tertiary amine compound.

8. The polyimide precursor solution according to claim 2, further comprising: at least one selected from the group consisting of a secondary amine compound and a tertiary amine compound.

9. The polyimide precursor solution according to claim 3, further comprising: at least one selected from the group consisting of a secondary amine compound and a tertiary amine compound.

10. The polyimide precursor solution according to claim 4, further comprising: at least one selected from the group consisting of a secondary amine compound and a tertiary amine compound.

11. The polyimide precursor solution according to claim 5, further comprising: at least one selected from the group consisting of a secondary amine compound and a tertiary amine compound.

12. The polyimide precursor solution according to claim 6, further comprising: at least one selected from the group consisting of a secondary amine compound and a tertiary amine compound.

13. The polyimide precursor solution according to claim 7, wherein the secondary amine compound and the tertiary amine compound are at least one selected from the group consisting of imidazoles represented by the following general formula (IM) and morpholines represented by the following general formula (MO),

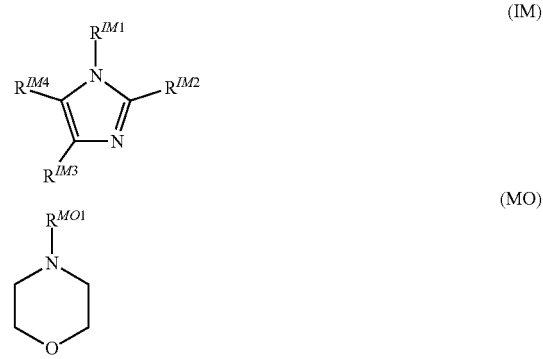

wherein, in the general formula (IM), $R^{IM1}$, $R^{IM2}$, $R^{IM3}$, and $R^{IM4}$ each independently represent a hydrogen atom or an alkyl group having 1 or more and 8 or less carbon atoms, and in the general formula (MO), $R^{MO1}$ represents a hydrogen atom or an alkyl group having 1 or more and 8 or less carbon atoms.

14. The polyimide precursor solution according to claim 1, wherein a volume content ratio of the particles to the polyimide precursor is 40/60 or more and 80/20 or less.

15. The polyimide precursor solution according to claim 1, wherein a content of the particles is 30 mass % or more and 85 mass % or less with respect to a total amount (date polyimide precursor and the particles.

16. A method for producing a porous polyimide film, comprising:
coating the polyimide precursor solution according to claim 1 to form a coating film, and drying the coating film to form a film containing the polyimide precursor and the particles; and
forming a polyimide film by heating the film to imidize the polyimide precursor, and removing the particles.

17. A porous polyimide film, which is produced by the method for producing a porous polyimide film according to claim 16.

* * * * *